(12) United States Patent
Castronovo

(10) Patent No.: US 7,240,864 B2
(45) Date of Patent: Jul. 10, 2007

(54) HELICAL CUTTING

(76) Inventor: Charles A. Castronovo, 706 Chanel Ridge Rd., Timonium, MD (US) 21093

( * ) Notice: Subject to any disclaimer, the term of this patent is extended or adjusted under 35 U.S.C. 154(b) by 0 days.

(21) Appl. No.: 11/483,539

(22) Filed: Jul. 11, 2006

(65) Prior Publication Data
US 2006/0249607 A1 Nov. 9, 2006

Related U.S. Application Data

(60) Continuation of application No. 10/942,033, filed on Sep. 16, 2004, now Pat. No. 7,100,852, which is a division of application No. 10/228,085, filed on Aug. 27, 2002, now Pat. No. 6,938,844.

(60) Provisional application No. 60/342,111, filed on Dec. 26, 2001.

(51) Int. Cl.
B02C 19/22 (2006.01)
(52) U.S. Cl. ............ 241/30; 241/89.3; 241/260.1
(58) Field of Classification Search ............ 241/260.1, 241/89.3, 30
See application file for complete search history.

(56) References Cited

U.S. PATENT DOCUMENTS

| 2,265,649 | A |   | 12/1941 | Krehbiel |
|---|---|---|---|---|
| 3,529,777 | A | * | 9/1970 | Dodson et al. ............ 241/18 |
| 3,948,026 | A |   | 4/1976 | Whitechester |
| 3,986,676 | A |   | 10/1976 | Husmann |
| 4,226,372 | A |   | 10/1980 | Wigand |
| 4,355,766 | A |   | 10/1982 | Wigand |
| 4,509,700 | A |   | 4/1985 | Svengren |
| 4,664,317 | A |   | 5/1987 | Morton |
| 5,284,433 | A |   | 2/1994 | Cates et al. |
| 5,320,287 | A |   | 6/1994 | Li |
| 5,340,034 | A |   | 8/1994 | Jang |
| 5,375,781 | A |   | 12/1994 | Schwelling |
| 5,439,181 | A |   | 8/1995 | Williams |
| 5,445,054 | A |   | 8/1995 | Pryor |
| 5,678,774 | A |   | 10/1997 | Bennett et al. |
| 5,697,560 | A |   | 12/1997 | Bennett |
| 5,772,129 | A |   | 6/1998 | Nishio et al. |
| 5,975,445 | A |   | 11/1999 | Ko |
| 5,997,560 | A |   | 12/1999 | Miller |
| 6,079,645 | A |   | 6/2000 | Henreckson et al. |
| 6,189,446 | B1 |   | 2/2001 | Olliges et al. |
| 6,334,582 | B1 |   | 1/2002 | Castronovo |
| 6,561,444 | B1 |   | 5/2003 | Yokomine et al. |
| 6,575,389 | B2 |   | 6/2003 | Neely |

* cited by examiner

*Primary Examiner*—Mark Rosenbaum
(74) *Attorney, Agent, or Firm*—Whitham, Curtis, Christofferson & Cook, PC

(57) ABSTRACT

True zero-clearance cutting on a commercial scale is provided via a cutting area including a sacrifice material that is relatively softer than the cutter. One example is a cutting system which is capable of cutting a material such as, for example, tape or paper, into a fiber or powder. The cutting system includes a cutting blade, typically a rotary cutter, and a sacrificial plate or round bar contacting the cutting blade. The contacting portion has a zero clearance during the cutting operation. A metering mechanism is also provided which is capable of metering the material at a predetermined rate to the cutting blade. A mechanism is also provided for incrementally moving the sacrificial blade towards the cutting blade to ensure that the zero clearance is maintained between the cutting blade and the sacrificial plate, even when the sacrificial plate begins to wear down due to usage. Also, destruction of the material is further enhanced by advantageous strategic patterning of cutting edges on a rotary cutter, and further by secondary shredding features. Systems are provided for reducing to-be-destroyed paper and other relatively-thin planar materials to a dust or powder-size.

5 Claims, 13 Drawing Sheets

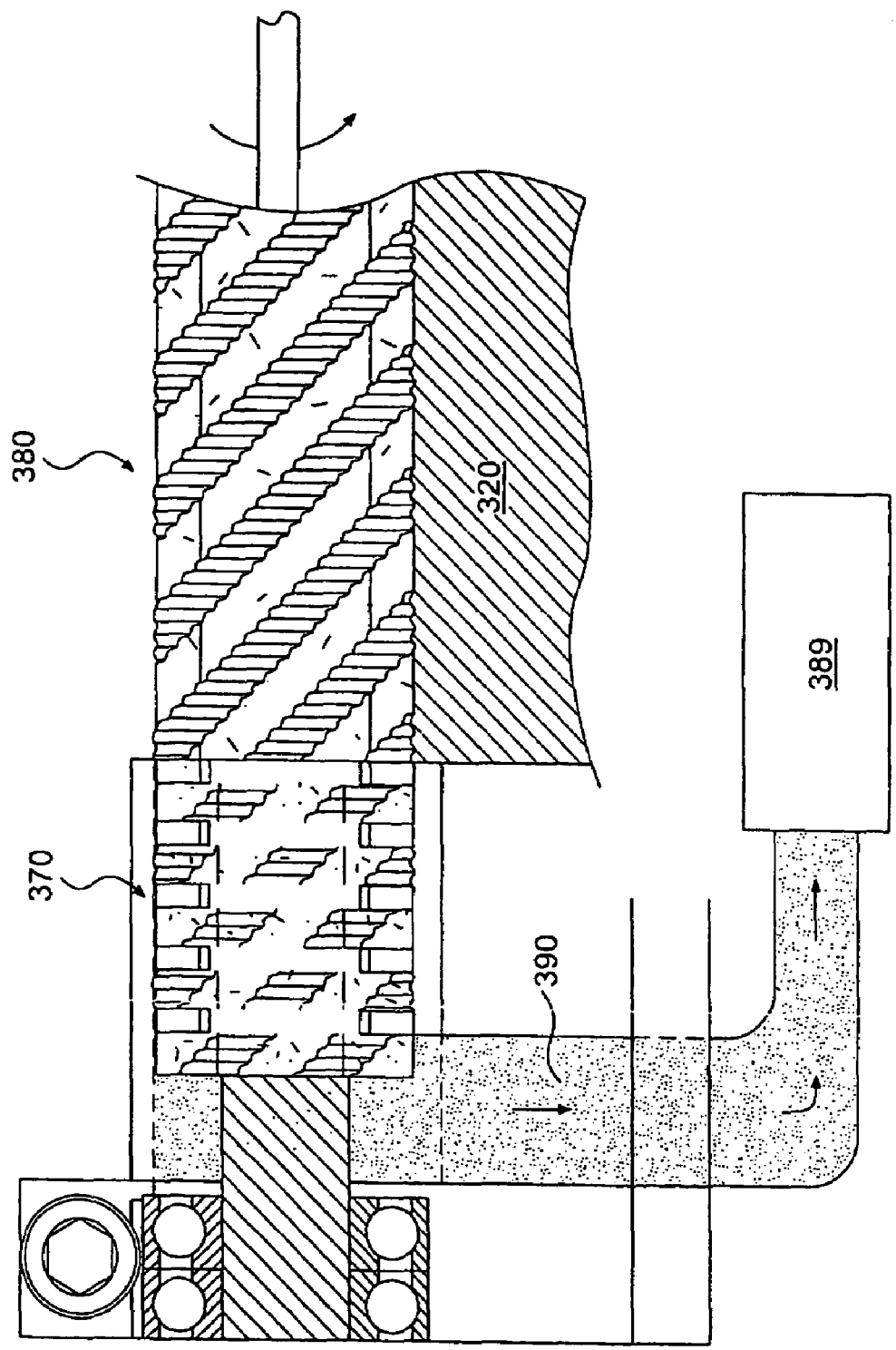

HELICAL CUTTING

RELATED APPLICATION

This is a continuation of Ser. No. 10/942,033, filed Sep. 16, 2004, which is a divisional of 10/228,085 filed Aug. 27, 2002 (patented as U.S. Pat. No. 6,938,844) in which Priority is claimed from a U.S. provisional application filed Dec. 26, 2001, Ser. No. 60/342,111, and that application is incorporated herein.

FIELD OF THE INVENTION

The present invention generally relates to cutting systems and, more particularly, to cutting systems capable of reducing material to either a shredded form or an unrecoverable fiber or powder form. Also, the present invention generally relates to cutting very thin materials, including very thin materials alone (such as paper, etc.) and very thin materials present with other components (such as a credit card, data card, compact disk, floppy disk, cassette tape, etc.); thick materials also may be cut.

BACKGROUND

There are many types of cutting systems used to destroy documents and other sensitive materials. These cutting systems may include, for example, shredders, pulverizers, grinders and other cutting systems. However, none of the currently known and used systems are capable of completely destroying a document or other sensitive material into an information-unrecoverable form using a simple "one-step" cutting approach. Existing document-destruction machines are intricate, complex, and delicate. This poses a problem in high security applications, such as highly sensitive or classified government documents that need to be easily and efficiently destroyed for various security or business reasons. Also, many of the known cutting systems are prone to wear, failure and other problems which require constant maintenance and/or refurbishment. The maintenance and/or refurbishment of these complex systems, of course, requires considerable "down-time" which, in turn, also adds to the overall costs of the system. An additional shortcoming of many of these systems is their single use nature, i.e., only capable of shredding, for instance, paper.

By way of example, U.S. Pat. No. 5,340,034 to Jang shows a paper grinder. In this system, a paper document is capable of being ground to a powder form; however, this system uses both a complex arrangement consisting of a corrugation system and an impacting or pulverizing system. In this system, if one of the components fails, for example, the corrugation system, then the document cannot be pulverized. This may result in a significant security risk. It is further noted that this system includes a complex array of rollers and cutters in order to perform the dual purpose of corrugation and pulverizing. This may lead to additional (i) component failure, (ii) maintenance and (iii) downtime, thereby increasing the cost of the entire system. Also, in the pulverizing step, it is necessary to repeatedly pulverize the material over an extended time period in order to achieve the powder form, thus resulting in a disadvantage of the system. It is lastly noted that this system appears to be capable of performing its functions only on paper products, but not other materials which may also need to be destroyed. This is a limiting feature of the Jang apparatus.

In another example, U.S. Pat. No. 6,079,645 to Henreckson shows a desktop shredder. In this shredder, a shredding knife simply shreds paper; however, this system does not and, in fact, appears to be incapable of completely shredding paper into an information-unrecoverable product. Instead, the paper is merely cut into strips. Also, this same system seems applicable only to paper products, thus limiting its applicability to other products (such as polyester ("Mylar") tape) which require shredding or destruction. See, also U.S. Pat. No. 5,975,445 to Ko. Similarly, U.S. Pat. No. 5,320,287 to Li also shows a paper shredder which is provided for the limited use on paper, and which also is incapable of providing an information-unrecoverable product. In fact, Li only discloses that the paper may be shredded into smaller pieces than "strip" shredders.

Of course other materials may also be destroyed for high security purposes. These materials may be, for example, Mylar or other thin films that carry printed, punched, magnetically recorded, optically recorded, or otherwise recorded information. Such materials may also need to be destroyed in a high security fashion. Conventionally, this could heretofore only be is performed by high-security document "disintegrators", which are heavy (several hundred pounds), expensive, power-hungry, and very noisy. Conventional shredding machines, including "disintegrators", tend to jam with such materials (like Mylar), which tend to stretch and spindle, rather than be cut properly by the shredding or "disintegrating" apparatus. As indicated at http://www.sdi-asac.com/NDSdest.doc, the U.S. National Security Agency (NSA) has evaluated certain conventional equipment as meeting, or not meeting, the requirements for routine destruction of classified and sensitive material, including high tensile strength paper tape, paper mylar-paper tape and plastic key tape as mentioned above.

Existing "high-security disintegrators" have the further disadvantage of limited effectiveness, in that the current Department of Defense standard for such machines specifies a $3/32$" output screen. This means that a particle as large as $3/32$" on a side may pass through the disintegrator and still meet the destruction standard. In many cases, a particle of this size may carry a considerable amount of recoverable optical or digital information.

Such films or film-containing papers could, of course, be destroyed by incineration, but this method is undesirable for reasons of health (toxic fumes from burning), convenience, and secrecy.

Acceptable standards for high-security destruction of paper and other products are being redefined to demand destruction into smaller-size particles. An unmet need remains for machines, devices, methods and systems by which to completely destroy to-be-destroyed materials, while providing ease, reliability and simplicity.

Scissoring is a cutting mechanism that has been conventionally applied to paper destruction, albeit with limitations. The limitations of conventional scissoring may be appreciated by considering a simple pair of hand-held scissors. Spring loading pushes one blade against the other blade. The blades are not completely straight, but are intentionally curved with a slight bow, sometimes with one blade bowed more than the other blade. As the scissors close, the structure is forcibly uncurved, which is how zero-clearance is conventionally achieved by spring loading in scissoring technology. Initially, when the scissors are new, at contact there are two sharp edges, which is what is wanted for cutting action. However, eventually the sharp edges get worn off, blunted, and ground away. Eventually at the traveling point of contact, blunting and voids in the edges occur, and clearance rather than zero-clearance occurs.

Certain conventional rotary shears have been attempted, to provide conventional shredders. A disk of tooled steel is notched. When that notched disk wipes past another part, cutting happens. However, if there is any clearance, a to-be-cut material does not get cut, but rather, goes between the cutting edges. Such an apparatus gets dull because the action of parts rubbing against each other wears away the material of each. When the parts are dull, the assembly must be taken apart and the head replaced. Zero-tolerance between parts can be kept by using spring-loading but such an arrangement is not actually cutting but rather is bludgeoning and takes more power than cutting.

To get a cross-cut operation, complex helical shapes are needed, and certain shapes have been used conventionally. Helically-fluted is the best of such conventional technology. Non-helically fluted shapes do not provide the cross-cut, but only the strip-cut. Strip-cutting cannot reduce the output to a size as small as desired, because the there is a limit to how thin the cutters can be made, which in turn limits how thin the resulting strips can be. Cross-cutting is needed to get smaller output.

A multiple-head (three-head) conventional cross-cutting destruction device is in use for high-security paper shredding. However, that device has these limitations (among others): 1) Multiple heads are needed to sequentially re-shred the material. This requires a costly and complex machine. 2) Even with multiple heads, the shredding cutter elements must be tightly spaced and thin, to get small-sized output. The cutting elements must therefore be somewhat delicate, which leads to shorter overall cutter life, greatly reduced reliability, and greatly increased susceptibility to damage from the introduction of staples, paper clips, etc. into the shredding process along with the paper. This is a problem for all high-security shredders, and the finer the output, the greater the problem. 3) Even with multiple heads, there is a possibility of oversized particles getting past all of the heads.

The conventional thinking has been that, as a practical matter, the output can be gotten only so small, from a length×width perspective, because of design and manufacturing limitations. Namely, the conventional three-head device used two fluted rotating, meshing cylindrical parts with scissoring action, with a precision fit established between scissoring parts. Strips with length and width dimensions are the output of the operation of the two fluted rotating, meshing cylindrical parts. The strip is then permitted to drop down, into a second set of the same arrangement of two fluted rotating, meshing cylindrical parts with scissoring action. Such conventional scissoring action, multi-head machines suffer from inherent limitations both through machining tolerances and through the impossibility, at a certain point even if a smaller parts can be made, of providing support for the reduced-size parts, and providing force to shred the paper without bending or breaking the delicate shredder parts.

Adding to the concerns and problems discussed above for paper and paper-like products, there is further considered the problems, perhaps even more technically complex, of destroying information stored on or in other media besides paper. For example, there is a need to be able to completely, reliably and easily destroy other kinds of information-bearing media, such as photographs, photo negatives, compact disks, credit cards, data cards, so-called "smart" cards (containing electronic data storage circuits as well as magnetic and optical data), plastic film, cassette tapes, magnetic tape, etc.

SUMMARY OF THE INVENTION

The present invention is directed to overcoming one or more of the problems as set forth above. The present inventor has found that zero-clearance cutting is provided in an arrangement in which a material-to-be-cut is disposed between a relatively hard cutter material and a relatively soft sacrifice material. The present invention exploits use of a relatively soft sacrifice material in conjunction with a cutter or cutting system.

In another preferred embodiment, the invention provides a method of reducing a to-be-destroyed material to very small particles, comprising: subjecting the to-be-destroyed material to zero-clearance cutting including a sacrifice system.

In another preferred embodiment, the invention provides zero-clearance cutting, by a cutting area including at least one cutting edge and at least one sacrifice material. Advantageously, the zero-clearance cutting may (but is not required to) be on a commercial-scale, i.e., may include cutting repetitions on the order of thousands, tens of thousands, hundreds of thousands, even minions, without dulling of the cutting edge. A particularly preferred example of a commercial-scale zero-clearance cutting system comprises: a cutting area including at least one cutting edge (wherein the at least one cutting edge is suitable for cutting a material-to-be-cut) and at least one sacrifice material (wherein the at least one sacrifice material is relatively softer than the at least one cutting edge), with the at least one cutting edge and the at least one sacrifice material arranged to receive therebetween a material-to-be-cut.

Any one or more of the following may be adjusted: a material of a cutting edge, a size of a cutting edge or edges, a pattern of a plurality of cutting edges, a manner of movement of the cutting edge or edges, a shape of the sacrificial material, a disposition and/or movement of the sacrificial material, and/or a feed of the material-to-be-cut. By such adjustments, to-be-destroyed materials may be cut into smaller pieces in many different piece patterns, with a most preferred example being cutting to-be-destroyed materials (such as paper, key-tape, photographs, credit cards, data cards, ATM cards, Smart cards, data chips, data-chip containing materials, compact disks, floppy disks, cassette tapes, etc.) into small pieces passing security standards and from which data cannot be recovered. Zero-clearance cutting according to the invention is particularly useful and advantageous where some relatively thin layer to be destroyed, whether the relatively thin layer is alone or in conjunction with another layer (such as a thick layer, e.g., a laminate).

In a particularly preferred embodiment, the invention generally provides rotating cutter systems in which the cutter includes many small cutting edges that respectively take tiny "nibbles" out of the to-be-destroyed planar material, with the axis about which the cutter rotates being parallel to the to-be-destroyed material. The cutter preferably rotates about a fixed axis of rotation, which axis preferably is itself generally non-moving. The cutter is generally configured so that a to-be-destroyed material, once first-cut by the rotating cutter, may be further cut and multiply re-cut by the raised cutting edges of the rotating cutter (preferred examples of which cutter are a cutter with raised cutting edge patterning in a cross-cut pattern or other strategic pattern). The initial cutting interaction generally occurs with the to-be-destroyed material tightly sheared between the rotating cutter edges and at least one solid sacrificial plate or blade or rod that is of a relatively-softer material than the cutter. The to-be-destroyed material is controllably fed into this tight shearing sandwich of sacrifice material/to-be-destroyed-material/rotating cutter.

The invention also provides cutting action comprising rotary scissoring, where one "blade" of the scissors rotates, and the other "blade" is a stationary sacrifice material. A to-be-destroyed material is fed (preferably controllably fed) between the respective rotating blade and sacrifice blade, preferably with continued rotary scissoring until the to-be-destroyed material has been destroyed (such as wherein the to-be-destroyed material has been converted into a security-level fine material).

Another embodiment provided by the present invention is that of a rotary scissors device comprising a first scissors blade and a second scissors blade, wherein the first scissors blade rotates and the second scissors blade is stationary, the stationary blade comprising a stationary sacrifice material that is relatively softer than the rotating blade. Such a rotary scissors device preferably includes a feeder receiving a to-be-destroyed material and providing the to-be-destroyed material between the respective rotating blade and sacrifice blade. Preferably such a feed is controllably metered. Preferably such a feeder accommodates paper. Preferably the rotary scissors device in continued operation provides zero-clearance yet does not suffer significant blade blunting or dulling that affects cutting due to the zero-clearance. In a most preferred embodiment, the inventive rotary scissors device's output is a security-level fine material.

Where the invention provides rotary scissoring or a rotary scissors device, preferably the rotating blade preferably is serrated. The two respective scissors blades are in zero-clearance or essentially-zero-clearance shearing contact with each other.

In yet another embodiment, the invention provides a method of destroying a to-be-destroyed planar material, comprising: passing the to-be-destroyed planar material through a rotating cutter system, wherein the cutter includes a plurality of cutting edges that respectively take tiny nibbles out of the to-be-destroyed planar material, with the axis about which the cutter rotates being parallel to the to-be-destroyed planar material. In such a method, preferably the cutter rotates about a fixed axis of rotation; and/or the cutter rotation axis is itself generally non-moving. In most preferred embodiments, preferably the method includes initial cutting of the to-be-destroyed material by at least one cutting edge of the rotating cutter, followed by further cutting by at least one other cutting edge of the rotating cutter; and/or comprises multiple further cutting; and/or the cutting edges of the rotating cutter are arranged in a strategic pattern.

The present invention in another embodiment provides a cutting system comprising shearing a to-be-destroyed planar material between (1) cutter edges provided on a rotating cutter and (2) at least one solid sacrificial material that is of a relatively-softer material than the cutter edges. Such a cutting system preferably includes a tight shearing sandwich of sacrifice material/to-be-destroyed-material/rotating cutter (and, in a further preferred embodiment, the to-be-destroyed-material is controllably fed into the tight shearing sandwich). The tight shearing sandwich is zero-clearance or essentially zero-clearance. Preferably, the cutter is cowled (most preferably, further including a secondary cowling). Preferably, the cutting system includes auger action for transporting initially-cut to-be-destroyed material.

In one aspect of the present invention, a cutting mechanism for disintegrating a material is provided. The cutting mechanism includes a mechanism for feeding the material at a predetermined, positively-controlled rate and at least one cutter (such as a rotary cutter) positioned downstream from the feeding mechanism. In the particularly preferred example of a rotary cutter, the edge of at least one sacrificial plate, preferably of softer material than the cutter, just barely contacts a portion of the rotary cutter during a phase of rotation of the rotary cutter. The contacting zone is a zero clearance portion between a portion of the rotary cutter and the sacrificial plate. The material is metered to the zero clearance zone by the metering mechanism for disintegrating the material into a fiber or powder form. A "sacrificial plate" and "sacrificial blade" are mentioned as shapes of sacrificial material according to the invention. Other shapes for sacrificial material in the invention may be used, such as, e.g., a round bar.

In another aspect of the present invention, the cutting mechanism includes a guiding mechanism and a metering mechanism downstream of, and in line with the guiding mechanism. A cutting mechanism having a zero clearance zone is also provided. The cutting mechanism includes a cutting blade array disposed concentrically about a shaft and at least one sacrificial plate or round bar having an arc zone conforming to a shape of the cutting blade. The zero clearance zone is disposed between at least a cutting portion of the cutting blade and the sacrificial plate or round bar.

In still further embodiments, a cutting mechanism includes a positively controlled feeding mechanism and a cutting mechanism having a zero clearance portion formed therebetween. The cutting mechanism includes a cutting blade disposed concentrically about a shaft and at least one rotatable sacrificial rod having an initial cutout portion. The zero clearance portion is disposed between at least a cutting portion of the cutting blade and the rotatable sacrificial rod.

In further embodiments, a method of destroying polyester material, paper or other material is provided. In these methods, for example, the polyester material is fed at a predetermined positively controlled rate towards a zero clearance portion formed between a cutter and at least one sacrificial blade or round bar. The polyester material is grabbed by a tooth of the cutter and pulled into the zero clearance portion with the tooth of the cutter. The polyester material is then sheared and/or crushed between the cutter and the sacrificial blade or round bar at the zero clearance portion. This same method can be used for material or other product, and the feeding rate may vary.

One preferred embodiment of the invention provides a zero clearance cutting apparatus, comprising: at least one cutter; and positively-controlled material feed mechanism for controlling a feeding rate of material to be destroyed; and at least one sacrificial blade or round bar abutting a portion of the at least one cutter during a rotation of the at least one cutter, the sacrificial blade or round bar being relatively softer than the cutter.

Another preferred embodiment of the invention provides a cutting mechanism for cutting a material, comprising: a metering mechanism for feeding in the material at a predetermined, positively controlled rate; a rotary cutter positioned downstream from the metering mechanism; and at least one sacrificial blade or round bar which contacts a portion of the rotary cutter during a phase of rotation of the rotary cutter, the contacting portion being a zero clearance portion between a portion of the rotary cutter and the sacrificial blade or round bar, wherein the material is metered to the zero clearance portion by the metering mechanism for disintegrating the material into a fiber or powder form.

The invention in a further preferred embodiment provides a cutting mechanism, comprising: a guiding mechanism; a metering mechanism downstream and in line with the guiding mechanism; and a cutting mechanism having a zero clearance portion, the cutting mechanism including: a cutting blade disposed concentrically about a shaft; and at least one sacrificial plate or round bar having an arc portion conforming to a shape of the cutting blade, the zero clearance portion being disposed between at least a cutting portion of the cutting blade and the sacrificial plate or round bar.

Another preferred embodiment of the invention provides a cutting mechanism, comprising: a positively controlled feeding mechanism; and a cutting mechanism having a zero clearance portion, the cutting mechanism including: a cutting blade disposed concentrically about a shaft; and at least one rotatable sacrificial rod having an initial cutout portion, the zero clearance portion being disposed between at least a cutting portion of the cutting blade and the rotatable sacrificial rod.

Additionally, the invention in a preferred embodiment provides a positively controlled feeding mechanism, comprising: a first side plate having a vertical slot and an opening; a second opposing side plate having a vertical slot and an opening; a driven capstan mechanism positioned between the first side plate and the second opposing side plate; and a roller mechanism having a roller shaft, the roller shaft being captured within the vertical slot of the first side plate and the vertical slot of the second opposing side plate, the roller shaft further being positionable relative to the opening of the first side plate and the opening of the second side plate for removal thereof.

In another preferred embodiment, the invention provides a method of destroying polyester material, comprising the steps of: feeding the polyester material at a predetermined positively controlled rate towards a zero clearance portion formed between a cutter and at least one sacrificial blade or round bar; grabbing the polyester material with a tooth of the cutter; pulling the polyester material into the zero clearance portion with the tooth of the cutter; and disposing the polyester material between the cutter and the sacrificial blade or round bar at the zero clearance portion.

An additional preferred embodiment of the invention provides a method of destroying paper, comprising the steps of: feeding the paper at a predetermined positively controlled rate towards a zero clearance portion formed between a cutter and at least one sacrificial blade or round bar; grabbing the paper with a tooth of the cutter; pulling the paper into the zero clearance portion with the tooth of the cutter; and disposing the paper between the cutter and the sacrificial blade or round bar at the zero clearance portion.

The invention also provides, in a preferred embodiment, a method of destroying a material, comprising the steps of: feeding the material at a predetermined positively controlled rate towards a zero clearance portion formed between a cutter and at least one sacrificial blade or round bar; grabbing the material with a tooth of the cutter; pulling the material into the zero clearance portion with the tooth of the cutter; and disposing the material between the cutter and the sacrificial blade or round bar at the zero clearance portion.

Additionally, in another preferred embodiment, the invention provides a method of protecting a cutter longevity and/or achieving zero-clearance cutting, comprising: sacrificing at least one solid blade bed or round bar against a cutter, wherein the blade bed is (a) relatively softer than the cutter and (b) relatively harder than an object or a material being destroyed by the cutter.

In the inventive apparatuses, mechanisms, methods, systems and products, the following are mentioned as preferred perfecting details and not as limitations on practicing the invention. With regard to the at least one cutter, a rotary cutter is mentioned as an example that may be used. The cutter may destroy a to-be-destroyed object by such preferable destruction as cutting, grinding, slicing, crushing, chopping and/or shredding.

The positively-controlled material feed mechanism may control particle size of the material being destroyed by controlling both (a) the feed rate of the material entering between the at least one sacrificial blade or round bar and the at least one cutter and (b) the rotational speed of the at least one cutter.

The output may be one of an information-unrecoverable product or a shredded product, and a disintegrated product.

The sacrificial blade may be one of a plate and a rotatable rod. The rotary cutter may be made from a first material and the sacrificial blade or round bar may be made from a second material which is softer than the first material (such as the first material being one of steel and carbide and the second material being aluminum). The sacrificial blade or round bar may include an edge (such as an arc shaped edge) which conforms to a shape of the path of the rotary cutter at the contacting portion. A mechanism may be included for incrementally moving the sacrificial blade or round bar into contact with the rotary cutter as the sacrificial blade or round bar wears down. The incrementally moving mechanism may be a rotating jackscrew mechanism coupled to the sacrificial blade or round bar. The jackscrew may include an outward extending plate or screw-tapped-plate which is adapted to lift the sacrificial blade or round bar into contact with the rotary cutter. There may be included a motor for driving the rotary cutter, the metering mechanism and the rotation of the jackscrew; and/or a gear reduction system between the motor and the jackscrew. The metering mechanism may include a pressure roller and a friction feed capstan. Also, with regard to the two rollers, one or both may be driven.

When a rotary cutter is used, the arrangement may be that at least one tooth of the rotary cutter grabs the material prior to the material being metered into the zero clearance portion. It may be provided for the combination of the rotary cutter and the sacrificial blade or round bar to cut the material into the fiber or powder form. There may be included a mechanism adapted to ensure the at least one sacrificial plate or round bar is in contact with the cutting blade during a rotation of the cutting blade. There may be included a pressure plate contacting the sacrificial plate or round bar, the pressure plate adapted to at least maintain a position of the sacrificial plate or round bar with respect to the cutting blade and substantially eliminating vibrations caused during a cutting procedure. There may be included a mechanism coupled to the pressure plate for providing pressure to the pressure plate. The pressure plate may be of such material density and size as to provide inertial damping of vibrations, in addition to simple spring-driven pressure.

In the disposing step, to-be-destroyed material may be shred into an information-unrecoverable form. The feeding may be incremental. An example of a feeding rate is 13 feet per minute in a practical embodiment.

In feeding the solid blade bed or round bar being sacrificed, examples of feeding may be feeding continuously or intermittently to the cutter (such as sacrificing by continuous feeding of the solid blade bed at a rate proportional to a rate of cutting and/or feeding the to-be-destroyed material or object; sacrificing by feed of the solid blade bed being sacrificed at a rate that is intermittent, adjustable, or in fixed increments, etc.).

BRIEF DESCRIPTION OF THE DRAWINGS

The foregoing and other objects, aspects and advantages will be better understood from the following detailed description of a preferred embodiment of the invention with reference to the drawings, in which:

FIGS. 12A-12D are views of an exemplary paper destruction device according to the invention. FIG. 12A is a side view (with stator 600 (see FIG. 12B) removed) of an exemplary paper destruction device. FIG. 12B shows the removed stator corresponding to FIG. 12A. FIG. 12C is a paper-feed view. FIG. 12D is a top view, showing an exemplary arrangement in a paper-destruction system, of an inventive primary cutter and secondary shredder.

DETAILED DESCRIPTION OF PREFERRED EMBODIMENTS OF THE INVENTION

In an important aspect, the invention provides zero-clearance cutting, by a cutting area including at least one cutting edge and at least one sacrifice material. It will be appreciated that at least one cutting edge is selected with regard to the material or materials desired to be cut, i.e., the cutting edge should be suitable for cutting the material or materials desired to be cut. The sacrifice material is selected with regard to the material of the cutting edge, namely, the sacrifice material must be relatively softer than the at least one cutting edge. A suitable sacrifice material should be firm enough to provide support so that a to-be-destroyed material is properly sheared and/or cut, and yet preferably should be no harder than necessary. Excessive hardness of a sacrifice material is avoided so as not to wear the cutting edge that contacts the sacrifice material more than necessary. Generally, a pair of a cutter material and a respective sacrifice material is selected based on the characteristics of the to-be-destroyed material. Preferably, the sacrifice material is selected so that the wear component due to the sacrifice material is trivial compared to the wear component due to the to-be-destroyed material.

Paper is a common material sought to be destroyed. Paper can be generally very abrasive, and tends to wear out a cutting blade applied to paper. Typically, a hardened steel (coated or uncoated) cutter is used for cutting paper. Preferred examples of a sacrifice material to use with a typical machined, hardened steel (coated or uncoated) cutter include, for example, common aluminum (with most preferred examples being Alloys 6063, 3003, 5052, etc.), etc. When a harder cutter material is used (such as, e.g., diamond or carbide), the desirable sacrificial material is still, of course, relatively softer than the cutter, but the sacrifice material will be particularly selected based both on the cutter material and on the thing being cut.

By so pairing a relatively-softer sacrifice material with a hard cutting edge, repetitions of zero-clearance cutting advantageously may be achieved on a commercial scale, i.e., may include cutting repetitions on the order of thousands, tens of thousands, hundreds of thousands, even millions, without significant dulling of the cutting edge due to the sacrifice material. Of course, optionally, non-commercial or fewer-repetition zero-clearance cutting operations also may be provided by the invention.

Figure 10A:
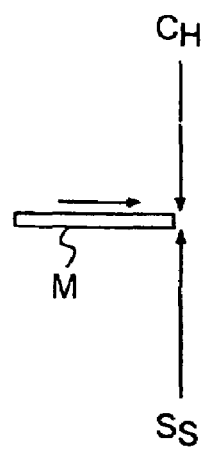
FIGS. 10A-10C show conceptual diagrams according to the present invention, in which a to-be-cut material M is cut.
Figure 10B:
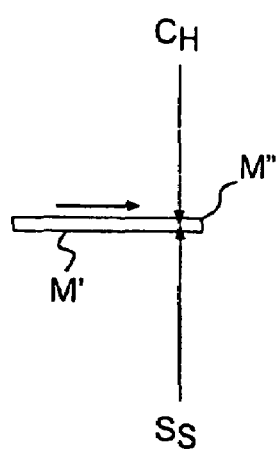
Figure 10C:
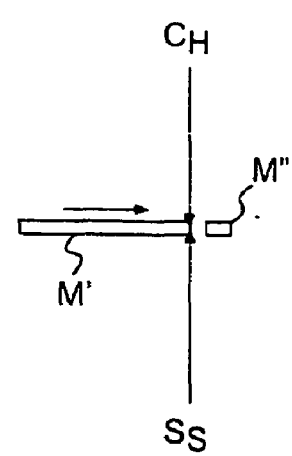

Reference is made to FIGS. 10A-10C, which are a conceptual depiction, in which the arrows for $C_H$ and $S_s$ conceptually mean the general use of a relatively hard cutting system and a relatively soft sacrifice material. Referring to FIG. 10A, it will be appreciated that at an initial time before a to-be-destroyed material M enters a cutting system used with a sacrificial material, there exists a gap between into which the to-be-destroyed material M can be inserted. As the material M travels through the gap between the cutting system $C_H$ and the sacrificial material $S_s$ the cutting system $C_H$ and/or the sacrificial material $S_s$ are operated so that the gap is only open for a relatively short time and that only a small part M' of material M passes before zero-clearance is forcibly established. Zero-clearance having been forcibly established so that original material M is separated into still-advancing piece M' and piece M" which has passed through the cutting area, piece M" then travels separately from piece M'. The process of FIGS. 10A-10C is repeated for M'. It will be appreciated that $C_H$ and $S_s$ are conceptual and do not necessarily represent a single cutter or cutting edge or a single sacrificial material. For example, advancing material M may encounter a first cutting edge, then, reduced to M', may encounter a second cutting edge, etc. It further will be appreciated that M" in FIG. 10C may be subjected to further processing (such as further cutting).

A particularly preferred example of a commercial-scale zero-clearance cutting system comprises: a cutting area including at least one cutting edge and at least one sacrifice material, with the at least one cutting edge and the at least one sacrifice material arranged to receive therebetween a material-to-be-cut. In mechanically arranging any cutting edges and sacrifice material used, there is taken into account the to-be-cut material, including the width, length, thickness, and overall composition of the to-be-cut material. The cutting edge(s) and sacrifice material are arranged so that the to-be-cut material is disposed in an opening between a cutting edge and the sacrifice material, and that cutting may occur with the cutting edge extending entirely through the to-be-cut material to directly contact the sacrifice material, resulting in a piece of the to-be-cut material separating from the to-be-cut material.

Any one or more of the following may be adjusted: a material of a cutting edge, a size of a cutting edge or edges, a pattern of a plurality of cutting edges, a manner of movement of the cutting edge or edges, a shape of the sacrificial material, a disposition and/or movement of the sacrificial material, and/or a feed of the material-to-be-cut. By such adjustments, to-be-destroyed materials may be cut into smaller pieces in many different piece patterns, with a most preferred example being cutting to-be-destroyed materials (such as paper, key-tape, photographs, credit cards, data cards, compact disks, floppy disks, cassette tapes, etc.) into small pieces passing security standards and from which data cannot be recovered.

Figure 13:
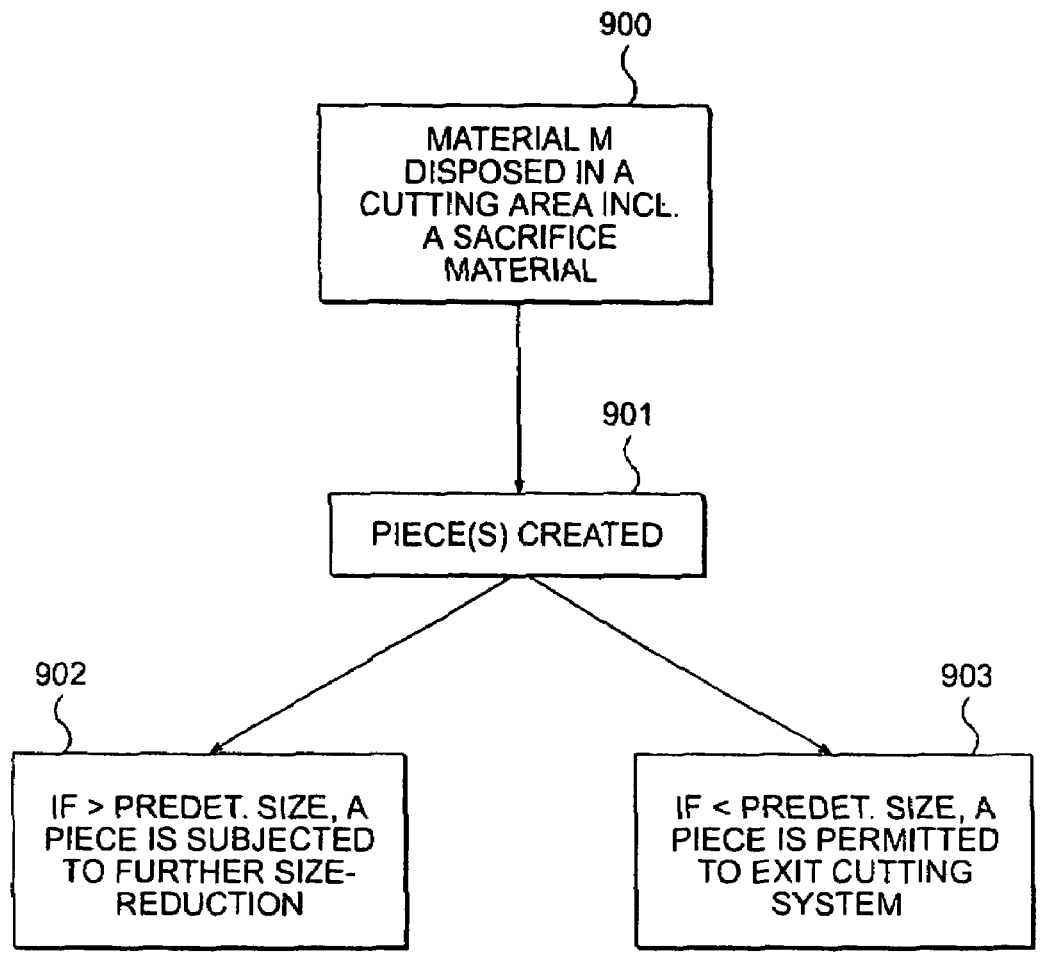
FIG. 13 is a flow-chart according to an inventive embodiment in which size of cut pieces is taken into account.

The zero-clearance cutting of the invention may be used in different ways, with a preferred example of use of zero-clearance cutting being cutting to achieve an output no bigger than a certain predetermined target size (such as an output meeting industry security standards, an output from which no data is recoverable, an output that is satisfyingly small from a naked eye visual perspective, etc.). A general embodiment of such a use of zero-clearance cutting to achieve an output no bigger than a predetermined target size may be appreciated with regard to FIG. 13, showing a zero-clearance cutting system with size-sensitivity as to the cut pieces. A to-be-destroyed material M is disposed (900) in a cutting area including a sacrifice material, whereby piece(s) are created (901). If the size of a piece is less than a predetermined size, the piece is permitted (903) to exit the cutting system. Such exit of appropriately-small size pieces can be mechanically provided by providing suitable cowling around the cutting area and adjusting size of any egress hole(s) for the sufficiently-small size pieces. It will be appreciated that where the particles are so small as to be dust-like (as may be achieved in a particularly preferred embodiment of the invention), preferably a vacuum system is used to collect and remove the small particles.

Still referring to FIG. 13, if the size of a piece is greater than a predetermined size, the piece is subjected (902) to further size-reduction, and more piece(s) are created (901). It will be appreciated that the further size-reduction may be cutting including a sacrifice material (in the same or different cutting area including a sacrifice material), or may be cutting not involving a sacrifice material, or may be non-cutting size-reduction. In a preferred example, there is used a rotary cutter patterned with strategically arranged cutting edges, and a to-be-cut material is first disposed in a cutting area including a sacrifice material working with a first cutting edge, and then a resulting piece or pieces are next disposed in a cutting area including the sacrifice material working with a second cutting edge. In another preferred example, zero-clearance cutting using a sacrificial material is used as an initial cutting system, and too-large particles are then further subjected to a no-sacrificial material secondary shredder system.

A particularly preferred use of the present invention is to cut a starting material into high-security fine pieces. Examples of a starting material with which the present invention is useable and which may be made into high-security fine pieces include: paper (such as a single sheet of paper, a stack of paper, etc.), a compact disk, key tape, magnetic tape (such as magnetic tape pulled from a cassette or cartridge, magnetic tape still within a cassette, etc.), a laminated data-bearing card, a credit card, a bank card, stored computer-readable data (such as in a diskette, hard disk, floppy disk, etc.).

The invention in one embodiment provides cutting action comprising rotary scissoring, where one "blade" of the scissors rotates, and the other "blade" is a stationary sacrifice material (most preferably a sacrifice material that is relatively softer than the rotating blade that it contacts). The stationary sacrifice material may be formed in the shape of any shape (such as a bar, etc.) that does not interfere with the cutting action the sacrifice blade with the rotating blade when a to-be-destroyed material is fed between the respective rotating blade and sacrifice blade. While in this embodiment of the invention, the general the arrangement of blades has some characteristics of a reel-type lawn mower, a reel-type lawn mower design would not be suitable for precision cutting at security-level standards, for at least several reasons, including the impossibility of getting the same-hardness, non-serrated blades sufficiently close together for reliably cutting a material-to-be-destroyed. The present invention exploits the advantages of rotary scissoring and rotary cutting, and solves the problems (such as rapid dulling of blades) associated with bringing two same-hardness blades in contact with each other. The present inventor has recognized that the contacting blades need not be of the same hardness, and preferably are not of the same hardness, and further has recognized advantages of using different hardness blades in cutting (preferably in rotary cutting), e.g., the ability to provide zero-clearance cutting action or essentially-zero-clearance cutting action.

An embodiment of the present invention is directed to a cutting apparatus used to shred or cut paper, tape or other materials or products into a shredded, cut or information-unrecoverable, disintegrated form such as a fine fiber or powder form. In a preferred embodiment, the fine fiber or powder form makes data or image recovery impossible and is thus very advantageous for security and other confidentiality reasons. The present invention is capable of providing such shredded or fine fiber or powder form through a single cutting process which thus minimizes component parts and maintenance issues while increasing efficiency and productivity. In order to provide the advantages of the present invention, the cutting apparatus incorporates a zero clearance cutting surface between a cutting mechanism and at least one sacrificial blade or plate or bar. The material or product is supplied to the zero clearance portion of the apparatus of the present invention at a predetermined feed or metering rate via a manual feeding or, alternatively, a feeding or metering mechanism such as, for example, motor and gear-driven rollers and the like.

This invention in a particularly preferred embodiment makes use of distinct and deliberately determined feeds, one for the material being cut, and the other for the gradual advancement of the sacrificial material into the cutting zone. Either may be automated or manually controlled.

The style of the cutter (e.g., the pattern, the teeth) is directed by the application. For example, a helically-fluted cutter with "chip-breaker" serrations on the flutes can be implemented to: (1) create small chips of residue, and (2) capture and direct the flow of the residue for secondary processing, when used in conjunction with a suitable cowling to keep the residue particles captivated by the flutes. Preferred examples of a cutter pattern are a rotary cross-cut or a herringbone file type of pattern. In another embodiment, the cutter can be like a helically-fluted milling cutter, preferably with "chip-breaker" serrations, off-set from each other, flute-to-flute, to produce tiny chips. For a tape-destruction machine, an exemplary cutter is one according to FIGS. 1, 2, 3, 5A-6D, with a preferred tape-destruction cutter having 24 helical teeth, interrupted by reverse-helix pattern grooves, with each helical tooth spiraling across the entire cutter length, interrupted by the reverse-helix groove pattern (with the reverse-helix groove pattern being ground on later in the manufacturing process in a preferred method of making such a cutter). For an 8½ inch wide paper-destruction machine, a preferred cutter is one with flute-grooves (especially suited to carry the chips to a secondary shredder section).

The invention particularly exploits the relative hardness relationship between a cutter (such as, e.g., rotary cutter 118 in FIG. 1) and a relatively less-hard sacrificial material (in a shape such as, e.g., sacrificial plate 120 or sacrificial rod 220). By way of example, the cutter may comprise tool steel, carbide or other high strength, relatively hard material. On the other hand, the sacrificial material may be aluminum or other relatively-soft material.

For any given cutter, the sacrifice material composition may appropriately be varied or selected, and may be used in various shapes and compositions, and disposed in various movements and patterns relative to a cutting edge with which the sacrifice material is desired to contact.

The cutting systems of the present invention may be used to destroy various materials, including paper, key-tape, paper-like material, etc., of various dimensions (such as various widths, such as key-tape-width, 8½ inch width, etc.); compact disks; photographs; floppy disks; film; credit cards, Smart cards, magnetic tape; etc.

Figure 1:
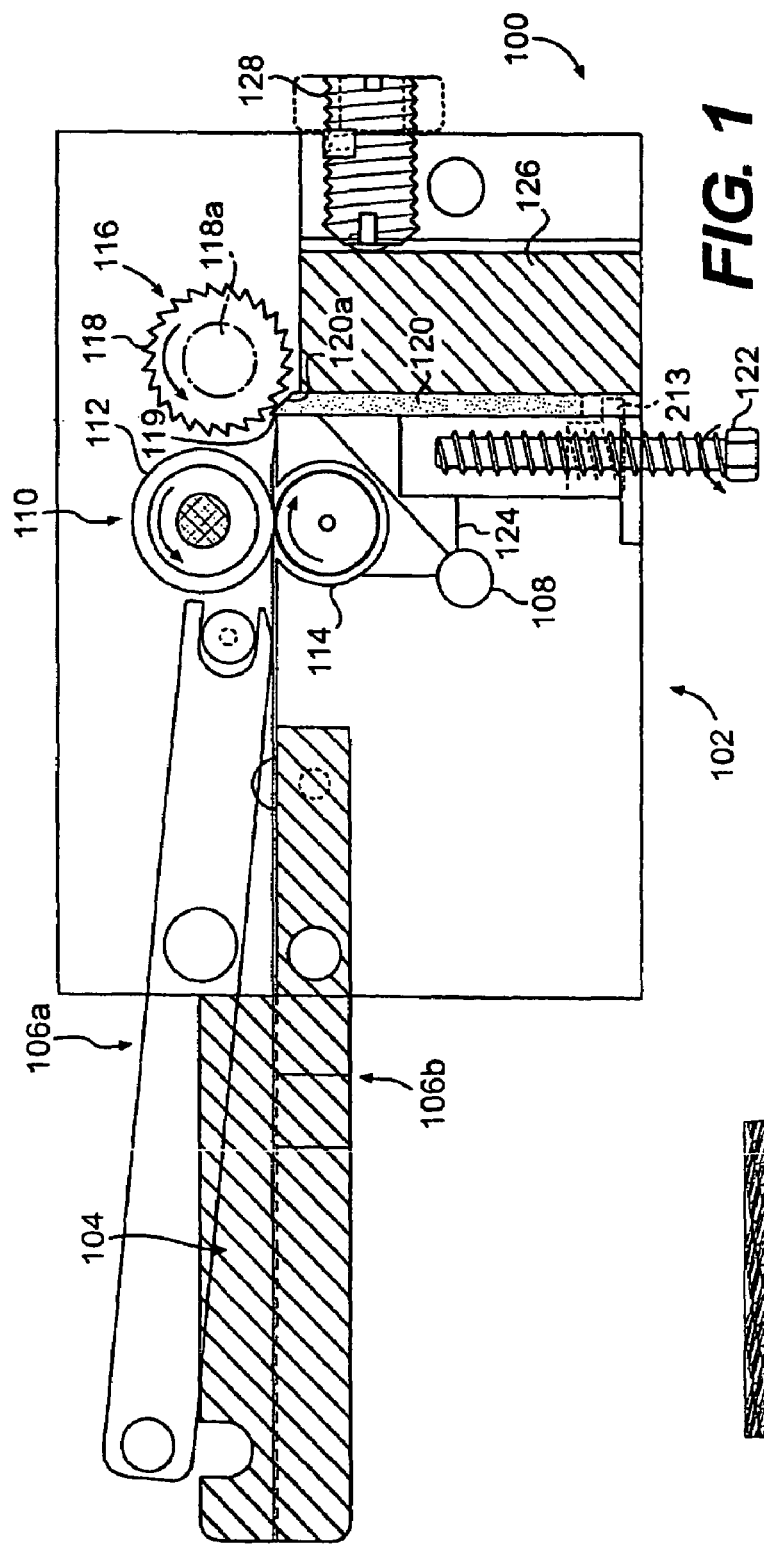
FIG. 1 shows a cross sectional view of a cutting system of the present invention, wherein a sacrificial blade is featured.

Referring now to FIG. 1, an overview of an exemplary cutting system of the present invention is shown. (FIG. 1 is the most preferred system for destroying tape; another embodiment is set forth below with reference to other figures, as the most preferred system for destroying standard 8½ inch wide paper.) The cutting system in FIG. 1 is generally depicted as reference numeral 100 and includes a housing or frame 102. A material guide 104 is mounted to the frame 102 via any conventional mechanism. The material guide 104 includes a pivotally attached upper mechanism 106a and a lower stationary guide plate 106b. In this arrangement, to-be-destroyed material such as, for example, tape (e.g., Mylar or other polyester film, etc.), paper or other product is guided to a cutting mechanism (described below) for disintegrating the to-be-destroyed material. The materials being fed may have information written thereon or punched thereinto or may simply be other types of product such as produce or the like. The arrangement of FIG. 1 can be used to destroy, otherwise difficult to destroy products, such as the Mylar tape and other products. A motor 108, of any conventional type, is mounted on the frame 102. In a specific embodiment, the motor is a 300 watt motor which uses 100-130 VAC or DC; however, any motor may be used including a motor capable of using an optional back-up battery system.

Still referring to FIG. 1, a feeding mechanism 110 is provided downstream and, in embodiments, in-line with the material guide 104. The feeding mechanism 110 includes a rubber pressure roller 112 and a friction feed capstan 114. The friction feed capstan 114 is preferably driven by the motor 108 which may provide, in embodiments, a predetermined, controlled feed rate of the product at approximately 13 ft/min (4 meters/min) or other rate. It should be readily recognized by those of ordinary skill in the art that the friction feed capstan 114 may provide a different metering rate by adjusting the revolutions per minute (RPM) of the friction feed capstan 114, itself. For example, the friction feed capstan 114 may be adjusted to 120 RPM, or a lower or higher RPM depending on the particularly desired feed rate. The feeding mechanism may also provide a very firm retardation (hold back) of the product being fed into the cutting mechanism. By increasing the feed rate (assuming a constant cutter rotational speed), a perforation (rather than a cutting) may be performed on the product. In embodiments, a user may also manually feed the product to the cutting mechanism.

The cutting mechanism, generally depicted as reference 116, includes a rotary cutter 118 and sacrificial material in the form of a sacrificial plate 120. In the embodiments of the present invention there is a zero clearance 119 zone between at least a portion of the rotary cutter 118 and the sacrificial plate 120; that is, a cutting surface of the rotary cutter 118 contacts the sacrificial plate 120 during the cutting process. The sacrificial plate 120 includes an edge 120a which substantially conforms to the arc shape of the rotary cutter 118. Due to the arrangement between the sacrificial plate 120 and the rotary cutter 118, any product supplied to the rotary cutter 118 will be either shredded or disintegrated to an information-unrecoverable fine fiber or powder form by passing through the zero clearance 119 zone depending on the particular cutter type used with the present invention.

There is a preferential geometric relation between the cutter, sacrifice contact zone, and point of material entry. Specifically, 1. Assume that the material approaches the cutting zone from the left of the cutter's center of rotation.

2. Drawing a line downwards vertically originating from the center of cutter rotation, and then another line downwards (same origin) at an angle of approximately 45 degrees, biased towards the left of the origin, the point where this line intersects the periphery of the cutter is the preferential material entry point, and also the point of contact with the sacrifice material. This is the location identified as reference numeral 119 in FIGS. 1, 3, 5A-5D, 6A-6D.

3. This approximate position 119 is preferential because material entering at this point will tend to be captured by the advancing cutter points or blades, but not tend to be dragged through the cutter/sacrifice interface any more than necessary.

It should be understood that if the material were to be fed above this point 119, there is less and less capturing tendency as the point of entry is raised. If the feed point is raised above the center of the cutter, the cutter will tend to push the material away, rather than draw it in. Also, if the point of entry is lowered, there is greater and greater tendency of the cutter to capture and drag the material through the cutter/sacrifice interface, which places unnecessary stress on the feeding mechanism, whose purpose is to force the material feed at a predetermined rate (not more, and not less). In an extreme case, the cutter mechanism could drag the material through with such force as to stretch or break the material, rather than "nibble away" at it. It is the controlled, "nibbling away" of the material by the cutter which allows the machine to produce the superior shredding action intended. This being the case, positive control of material in-feed is essential, and achieved partly by an advantageous, appropriate geometry.

It is preferred that the rotary cutter 118 be made from a material which is harder than the sacrificial plate 120. By way of example, the rotary cutter 118 may comprise tool steel, carbide or other high strength, relatively hard material.

On the other hand, the sacrificial plate 120 may be made from aluminum or other softer material. In embodiments, the sacrificial plate 120 is made from material which allows approx. 30,000 feet of product to be fed through the rotary cutter 118 prior to a one-inch-length of sacrificial plate 120 completely being consumed. Similarly, the rotary cutter 118 is made from material that allows 40,000 feet of paper product to be fed through the rotary cutter 118 prior to the rotary cutter 118 wearing down due to usage. Polyester and other materials may cause much faster cutter wear. Of course, the sacrificial plate 120 and the rotary cutter 118 may wear down or become duller at other rates depending on the particular materials used to make the sacrificial plate 120 and the rotary cutter 118 and the product being fed and the feed rate therethrough; however, it is preferred that the sacrificial plate 120 be designed to wear down much more slowly than the rotary cutter 118.

It should further be recognized by those of ordinary skill in the art that the rotary cutter 118 is driven by the motor 108, and may be driven at a different rate than the feeding mechanism 110. By adjusting the feeding rates of the rotary cutter and the feeding mechanism 110, different types of cuts or shredding patterns may be accomplished. Also, the rotary cutter 118 may be any type of rotary cutter such as, for example, a helical cutter, a milling cutter with helical pitches or flutes, razor blade cutting edges, a perforator, or the like. The rotary cutter 118 may additionally have various diameters such as ½ inch diameter and should, preferably, be concentrically mounted to a shaft 118a.

The motor 108 may additionally drive a jackscrew 122 or other lifting mechanism that is designed to incrementally move the sacrificial plate 120 into contact with the rotary cutter 118. This ensures that contact remains between the rotary cutter 118 and the sacrificial plate 120, even as the sacrificial plate 120 wears down due to usage. The jackscrew 122, in embodiments, includes an outward extending non-rotating jacknut plate 213 which contacts a portion of the sacrificial plate 120. The jacknut plate 213 lifts the sacrificial plate 120 as the jackscrew 122 rotates, via the motor 108 (through a suitable gear train). To incrementally move the sacrificial plate 120, via the jackscrew 122, a gear reduction system 124 is provided between the motor 108 and the jackscrew 122. By way of example, a gear reduction system may revolve the jackscrew one-half revolution/hour at a cutter speed of 15,000 RPM.

FIG. 1 further shows a pressure plate 126 and a spring plunger 128. The pressure plate 126 is provided for two purposes: (i) ensuring that the sacrificial plate 120 is maintained in a proper position with relation to the rotary cutter 118 and (ii) minimizing or dampening the vibration created by interaction of the rotary cutter 118 and the sacrificial plate 120 during the cutting process. The latter feature is provided by the pressure provided by the spring plunger 128 and the simple inertia of the pressure plate 126 itself. The pressure plate 126 should preferably allow sliding movement of the sacrificial plate 120 towards the rotary cutter 118 during the operations thereof. It is noted that the pressure plate 126 should, however, not be in contact with the rotary cutter 118, although it is deliberately positioned so as to provide pressure and vibration dampening to the sacrifice plate in as close a proximity as practicable to the cutting zone 119.

A vacuum source and collection bag (not shown) may also be used with the present invention. The vacuum source and collection bag will ensure that no fiber or fine powder contaminates the mechanisms and surrounding area. The vacuum source and collection bag also allow for easy clean up and the like.

Figure 2:
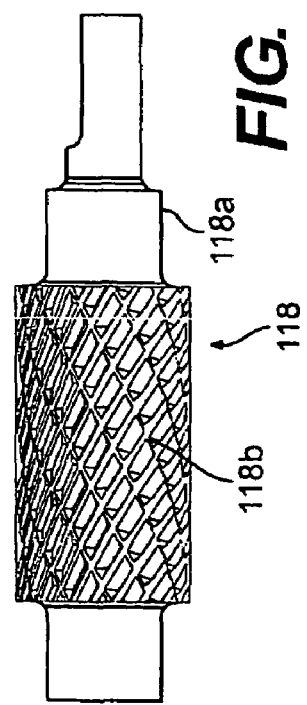
FIG. 2 shows an embodiment of a rotary cutter according to the present invention.

The rotary cutter 118 may include many different types of cutting patterns, with the type of cut or shredding of the product depending on the type of cutting blade. For example, a helical cutting blade will not cut an entire strip of the product, but will instead cut chunks or nibbles from the product. On the other hand, a straight cutting blade or array of razor blades, for example, may cut the product into strips. This provides additional flexibility to the system of the present invention. A plain rotary file is not considered a preferred design, because the output might be slivers rather than chips, and the slivers theoretically could be as long as the tape is wide (1") which is undesirable. FIG. 2 shows an embodiment of one rotary cutter 118 used with the present invention and especially suited to tape destruction. In FIG. 2, the rotary cutter 118 is shown to include a concentrically mounted shaft 118a and a rotary file style cutter with a helical pattern 118b. A cross-cut rotary file-type cutter pattern provides tiny chips laterally (across the tape width).

(a) A cut zone follows a line drawn touching the cutter exterior surface and parallel to the cutter shaft; moving across the tape in the line of the cut zone, the individual teeth of the cutter are in varying phases of engagement along the line of the cut zone, which results in short widths of each chunk.

(b) The length of the resulting chip (along the tape length) is determined by the relationship between the rotary speed of the cutter and the speed of the tape feed into the cutter. Individual teeth engage the tape in the cutting zone in very rapid succession as the cutter rotates. Because only a very small length of tape is fed into the zone for each passage of a tooth, the resulting chips are very short.

The net result is that the chips are both short and narrow. By arranging combinations of rotary speed and rate of feed of to-be-destroyed material, the destruction device can be configured to produce dust-like particles.

One successful embodiment of the cutter uses a cross-cut herring-bone pattern for the cutter surface (as shown) which could be made from a cutter such as Manhattan Supply Co. part #60469665, a commercially available cross-cut rotary file. The cutter may also be made by using a common ½" diameter, 2-flute or 4-flute milling cutter, with its two ends ground down to a diameter suitable for the bearings selected. An ordinary tool-steel twist drill could have its flutes reground and be similarly modified for use as a cutter. In further embodiments, the cutter may also be made from an elongated spur gear of hardened material, with the external cylindrical-shaped surface ground so that the tooth ends are sharp, with its two ends ground down to a diameter suitable for the bearings selected. The sharpened teeth would then nibble off the to-be-shredded material trapped between the teeth and the sacrificial bed material. As to size, the cutter diameter may be about ½" but is not required to be a particular diameter, except that if the cutter is very long (e.g., 9 or more inches for full-size paper shredding), it must be of sufficient diameter to be stiff enough not to bend or whip around at its middle section during high speed rotation. It should also be rigid enough so that its cutting surfaces stay engaged to the sacrifice material throughout rotation.

Figure 3:
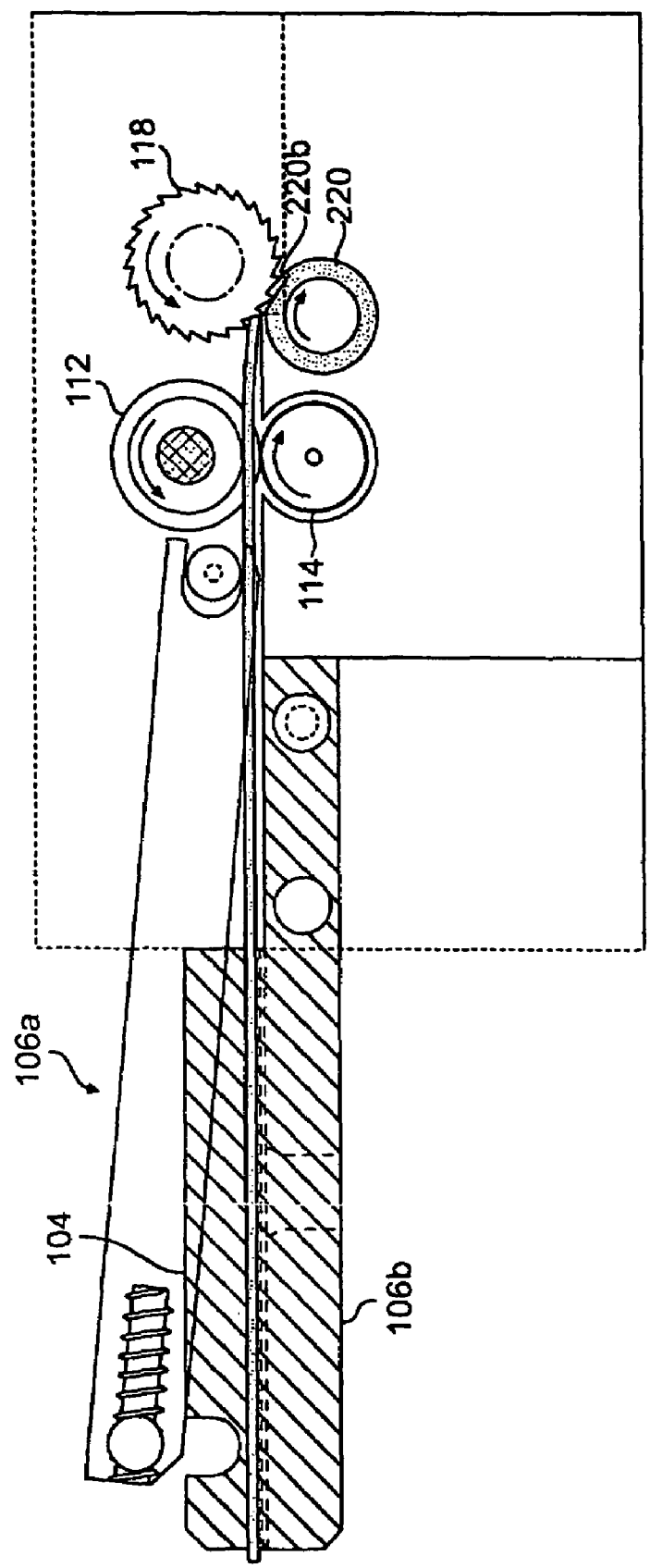
FIG. 3 shows another embodiment of a cutting system of the present invention, wherein a round bar of sacrificial material is featured.

FIG. 3 shows another embodiment of the present invention. In this embodiment, the sacrificial material is in the form of a rotary-mounted sacrificial blade 220. That is, the sacrificial blade 220 is a rotating sacrifice rod which is gear driven at preferably 0.01 revolutions/hour. The rod is preferably ⅜" in diameter. Of course, other revolution rates and diameters are also contemplated for use with the present invention. The cutting action and associated behaviors will be the same as that of the embodiment shown in FIG. 1. As seen in FIG. 3, a notch 220b is provided at the cutting surface for initial installation of the sacrifice blade 220.

FIGS. 4A-4D show a pressure system and quick change mechanism adapted for use with the feeding mechanism 110 and more particularly the rubber pressure roller 112 of the present invention. Beginning with FIG. 4A, side plates 130 are positioned on opposing sides of the pressure roller 112. A roller shaft 112a, positioned concentrically within the pressure roller 112, extends between the two side plates 130 and more particularly is captured by vertical slots 132 which are machined in the side plates 130. The slots 132 include through-holes 132a. The roller portion of the pressure roller 112 will freely rotate on the roller shaft 112a via bearings or bushings affixed concentrically inside of roller 112.

Pressure screws 134 protrude down into the slots 132 which, in conjunction with spacers 136, establish a maximum distance that roller shaft 112a can be pushed downwards by the pressure screws 134 towards the capstan 114. In this manner, the rubber material of the pressure roller 112 provides a pinching of the material to be shredded against the capstan 114. That is, the force of the screw ends are able to travel a certain distance (established by screw length and spacer thickness) which then, in turn, forces a predetermined deflection of the rubber-like material of the roller 112. This provides positive control of material feed, as established by the capstan 114 rotation, and this also eliminates the need for a separate spring. The deflection determination is fixed by design (thickness of the spacers), but relieves the operator from making any routine pressure adjustment. This provides a significant operational advantage of simplicity.

This mechanism also eliminates the need for a separate swing-arm and associated pivots or bearings and other hardware to mount and control and provide pressure to the roller.

Figure 4A:
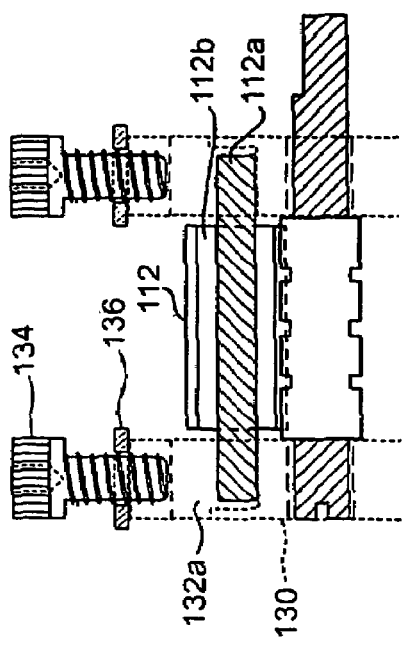
FIGS. 4A-4D show a pressure system and quick change mechanism of the pressure roller of FIGS. 1 and 3.
Figure 4B:
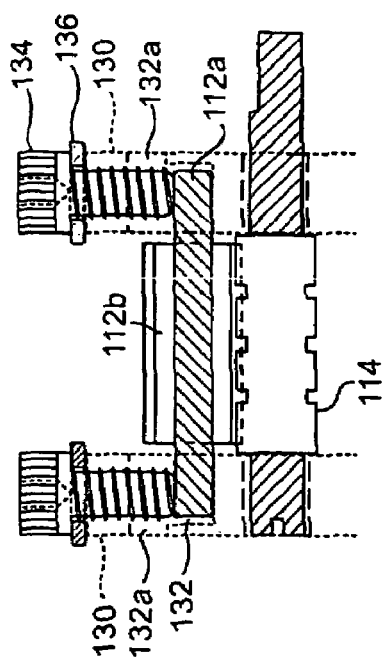
Figure 4C:
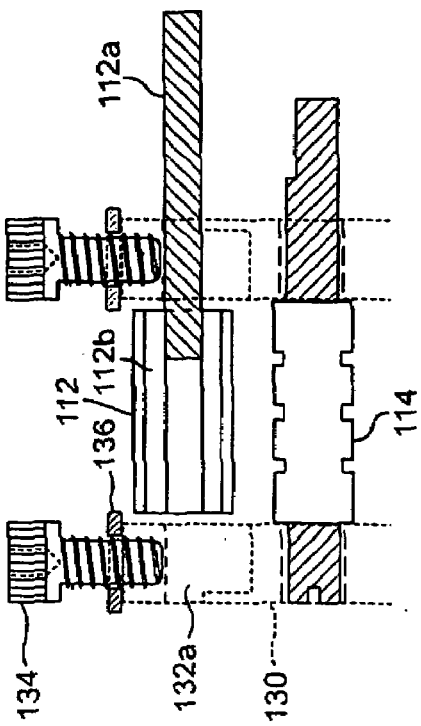
Figure 4D:
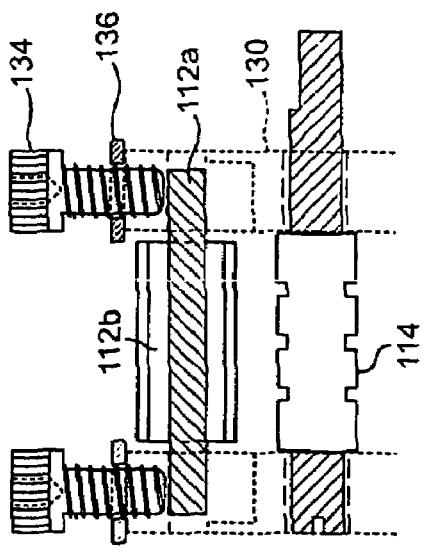

As further discussed with reference to FIGS. 4B-4D, the present configuration of the side plates 130 further allows for a quick changing scheme of the roller 112. Specifically, in FIG. 4B, it is shown that the pressure screws 134 are loosened and backed out part-way. The entire roller 112, together with the roller shaft 112a is then raised (FIG. 4C) to the height of the opening 132a. Then, as seen in FIG. 4D, the roller shaft 112a can easily be removed through (e.g., slipped through) either one of the openings 132a of the side plates 132. The roller 112 is now free to be pulled out and replaced. Reassembly takes place by reversing the disassembly order of FIGS. 4B-4D. This mechanism provides for very fast and easy disassembly for jam clearance, inspection, roller shaft 112a, or roller 112 replacement. It provides an irreducibly minimal parts count, with no need for adjustment. The roller is simply replaced when it is worn out.

FIGS. 5A-5D show the various operational positions of the to-be-destroyed material being metered through the cutting system of the embodiment of FIG. 1. A machine according to FIGS. 1 and 5A-5D has been particularly useful in the example where the to-be-destroyed material is paper/polyester tape, or polyester tape. However, other material such as paper or the like may equally be used with the present invention.

Figure 5A:
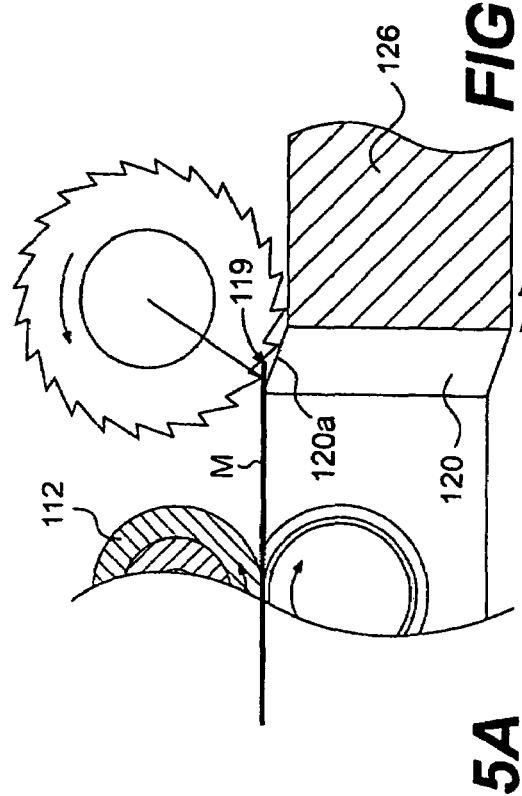
FIGS. 5A-5D show a to-be-destroyed material in various positions within a cutting system of FIG. 1, with a sacrifice blade being used in conjunction with a rotary cutter, with the view enlarged to show the interaction between the material to be destroyed M, the rotary cutter, and the sacrifice blade
Figure 5B:
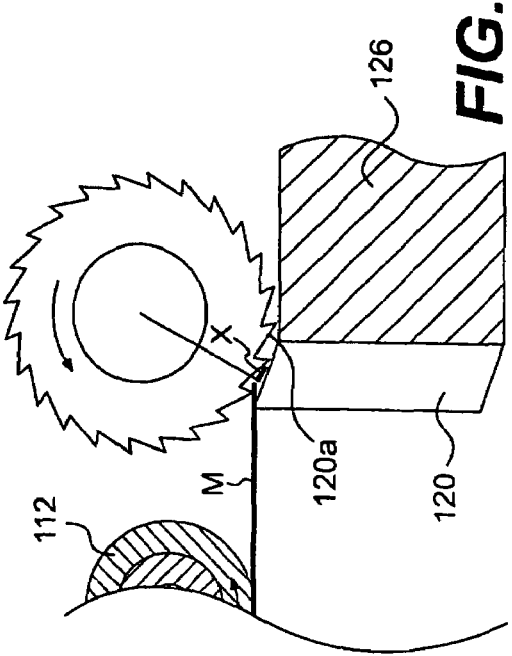
Figure 5C:
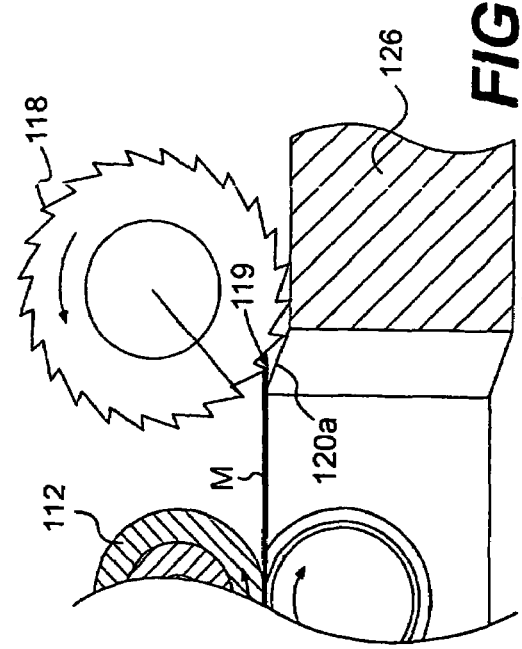
Figure 5D:
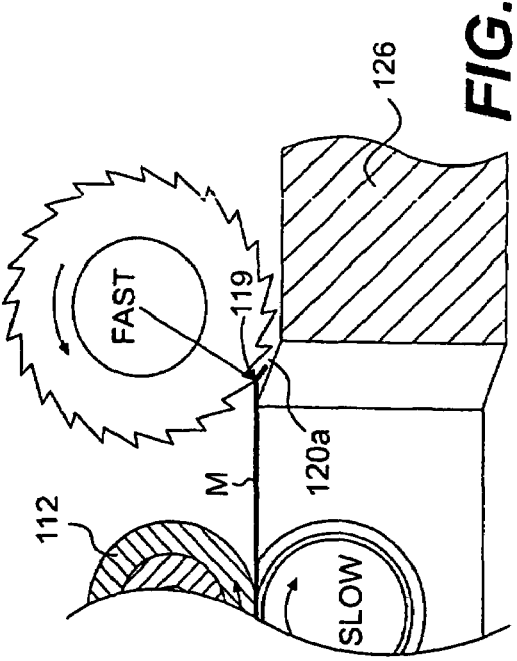

FIG. 5A shows the to-be-destroyed material M prior to engagement between the rotary cutter 118 and the sacrificial plate 120. FIG. 5B shows the material M being engaged by a tooth 118c of the rotary cutter 118. In this manner, the material M begins to be pulled into the zero clearance zone 119 between the rotary cutter 118 and the sacrificial plate 120. In FIG. 5C, the material M is positioned within the zero clearance zone 119 between the tooth 118c of the rotary cutter 118 and the edge 120a of the sacrificial plate 120. In FIG. 5D, an extremely small portion X of the material M is sliced off between the rotary cutter 118 and the sacrificial plate 120. The steps of FIGS. 5A through 5D are repeated until no further material M is available for metering to the cutting mechanism. The material may be destroyed at various rates such as, for example, four seconds for a segment of approximately 10 inches; however, other destruction rates may also be provided depending on the specific rotation of the cutting mechanism and the metering mechanism.

Figure 6A:
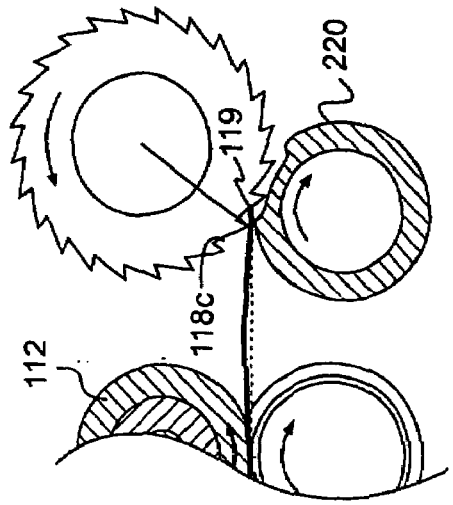
FIGS. 6A-6D show a to-be-destroyed material in various positions within a cutting system of FIG. 3, with a round sacrificial material being used in conjunction with a rotary cutter, with the view enlarged to show the interaction between the material to be destroyed M, the rotary cutter, and the sacrifice material.
Figure 6B:
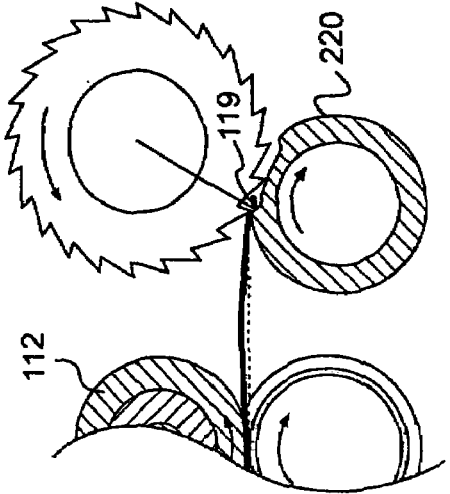
Figure 6C:
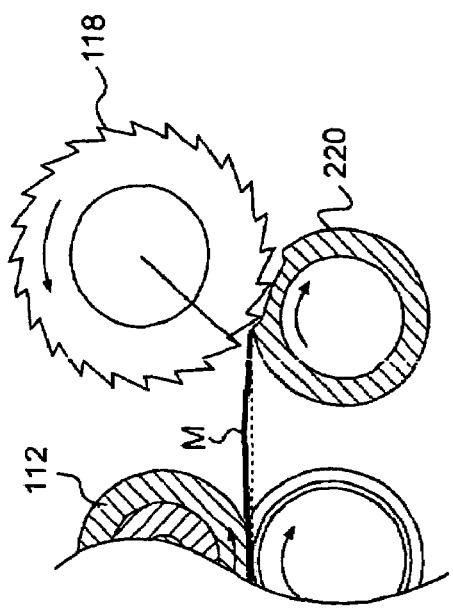
Figure 6D:
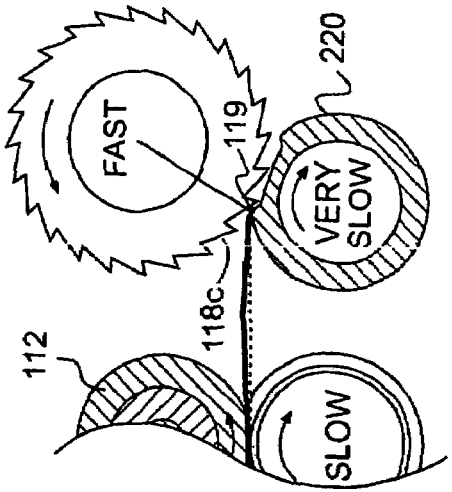

Akin to FIGS. 5A-5D in which a sacrificial plate 120 is shown, FIGS. 6A-6D show a product in various positions within the cutting system when the sacrifice material is a sacrifice rod 220. FIG. 6A shows the material M prior to engagement between the rotary cutter 118 and the sacrifice rod 220. FIG. 6B shows the material M being engaged by a tooth 118c of the rotary cutter 118. In this manner, the material M begins to be pulled into the zero clearance zone 119 between the rotary cutter 118 and the sacrificial rod 220. In FIG. 6C, the material M is positioned within the zero clearance zone 119 between the tooth 118c of the rotary cutter 118 and the sacrificial rod 220. In FIG. 6D, an extremely small portion of the material M is sliced off between the rotary cutter 118 and the sacrificial rod 220. The steps of FIGS. 6A-6D are repeated until no further material M is available for metering to the cutting mechanism.

Using the apparatus of FIG. 1 or FIG. 3 on to be destroyed paper, polyester or other types of products advantageously provides an output of high security material, most preferably a powder of finely grained material of a granular size. In this manner, the data previously recorded in or on the disintegrated product will be information-unrecoverable. As should also be understood by those of ordinary skill in the art, the present invention may also increase the number and variety of the materials which may now be written on, printed on, punched into or the like by allowing the total destruction of such materials, which was not otherwise practical. Plastic recording tapes containing video, audio, and digital information have heretofore been very difficult to destroy, even with existing large, heavy, expensive, and noisy high-security disintegrators.

It should now also be understood that the sacrificial plate or rod takes the place of, and performs the function of, a "blade bed" in a conventional cutting arrangement, such as might be found in a reel-type lawn mower, and many types of cutting machines. In the familiar example of the mower, the blade bed is usually of a hard material, and is manually adjusted so as to allow the closest practicable approach of the reel blades, without actually coming into contact with the reel blades. If the blade bed were to actually contact the reel blades, either the reel blade or the blade bed edge would be quickly worn away. If there is any eccentricity in the path of even one reel blade, wear on one part or the other would immediately result in some clearance between the reel blades and blade bed.

Now, if we imagine that the "grass" is thin polyester film, or some other very tough, thin material, one can readily see that the desired cutting would not take place, because the material might well be thinner than the blade-to-bed clearance. The material would simply "slip" between blade and bed. Constant re-adjustment of the bed blade clearance would be required, and this would result in intolerable wear to blades and bed. By providing a suitable sacrificial blade bed with an automatic feed (at minimal rates) of the "sacrificial" bed material, the present invention overcomes this difficult problem. Very thin, tough materials can now be cut or shredded easily with this arrangement.

It will be appreciated that the invention thus provides cutting machines, products and methods in which true zero clearance cutting clearance is effectively achieved. Cutting machines heretofore had some clearance between blades or between blades and beds. For example, scissors use spring tension to cause a wiping action between blades, but because scissors blades are BOTH hard materials, a mechanical, automated scissors would dull or wear rather quickly. The present invention solves that problem with mechanical, automated scissors.

In operation of a cutting system according to the invention, a particularly preferred rate for feeding sacrifice material is approximately 30 millionths of an inch of sacrifice material per foot length of destroyed material (in the case of a sacrificial blade material) and a feeding rate of approximately 30 micro-inches of sacrifice material per foot length of destroyed material, or about 400,000 inches of destroyed material per inch of sacrifice material (in the case of round sacrifice bar, see also Example 2 below).

Additionally, the invention may be applied regarding a non-rotary cutter. A scheme according to the invention may be adapted for use with a scissors-like, reciprocating, or guillotine-like cutter. An ordinary office-type hand-operated paper cutter may be modified so that instead of the usual hardened-steel stationary bed blade, the bed blade is of a sacrifice material, with a mechanism to advance the sacrifice material in minute increments.

Above, a round bar has been mentioned, and a round bar is thought the easiest implementation. Instead of a round bar, a flexible material incrementally fed from a roll may be used.

It will be appreciated that the invention may be used for destruction of to-be-destroyed materials of various dimensions. When the to-be-destroyed material is key tape, or of key tape width, a preferred example of a destruction machine is that of Example 1 below. When the to-be-destroyed material is paper of standard 8½ inch width, a preferred example of a destruction machine is that of Example 3 below, in which a 9 inch wide sacrificial plate is used. The sacrificial plate or blade size may be adjusted to the width of the to-be-destroyed product. For a relatively wide to-be-destroyed product, appropriate engineering considerations may be made to account for the relative width, such as jacking up the sacrifice plate at two points.

A particularly preferred embodiment of the present invention is a destruction machine for to-be-destroyed 8½ inch-wide paper. A particularly preferred embodiment of such a destruction machine for 8½ inch wide paper may be appreciated with reference to FIG. 12A.

For a destruction machine particularly suited for 8½ inch wide paper, the cutter used should be relatively harder than the sacrifice material. Particularly preferred is a cutter made from cobalt steel, coated with titanium nitrate (to enhance its hardness).

Figure 11:
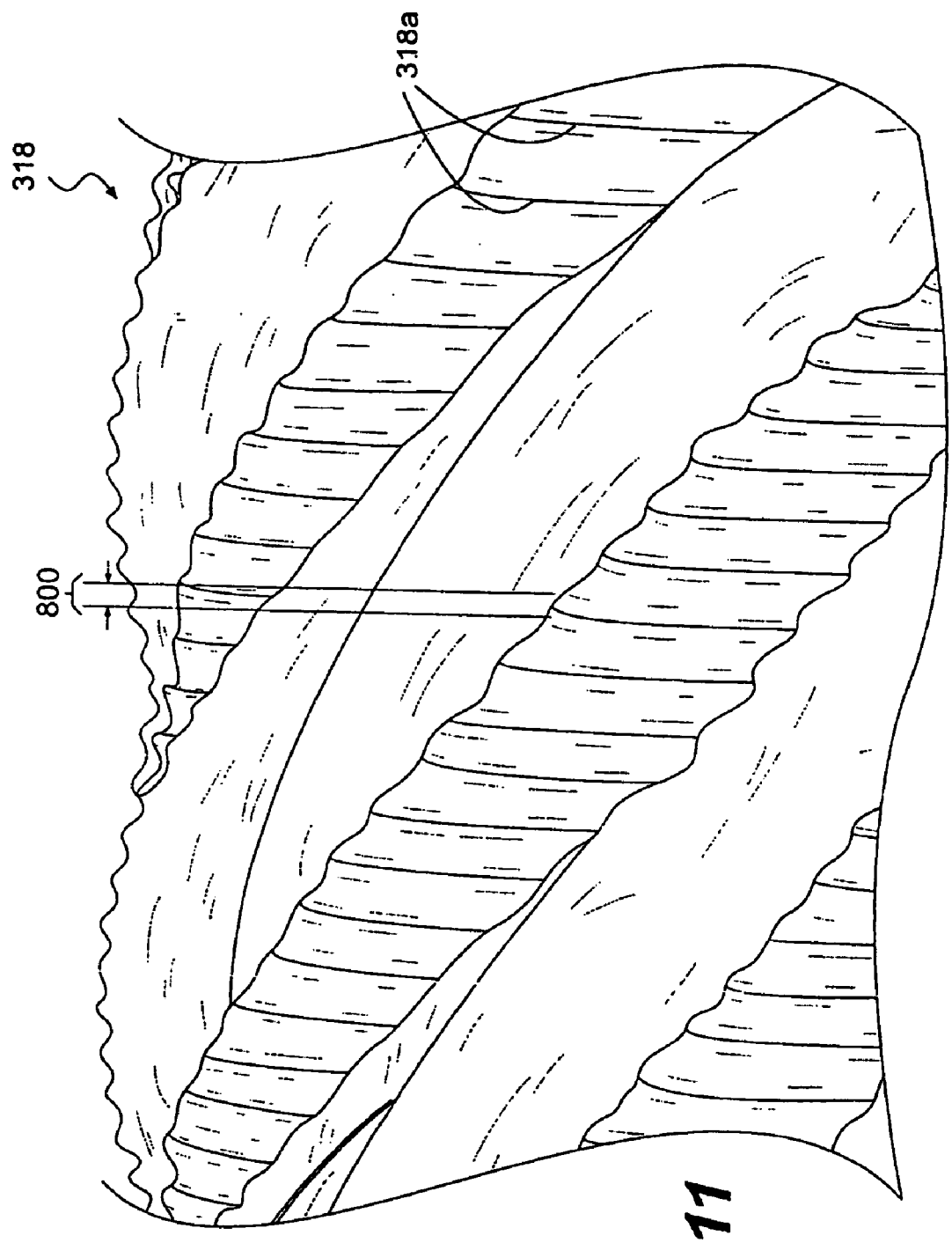
FIG. 11 shows, close-up, an embodiment of a cutting mechanism that is especially preferred for destroying standard 8½ inch wide paper, with the close-up view particularly showing that the leading edges of the serrations are laterally offset slightly.
Figure 12A:
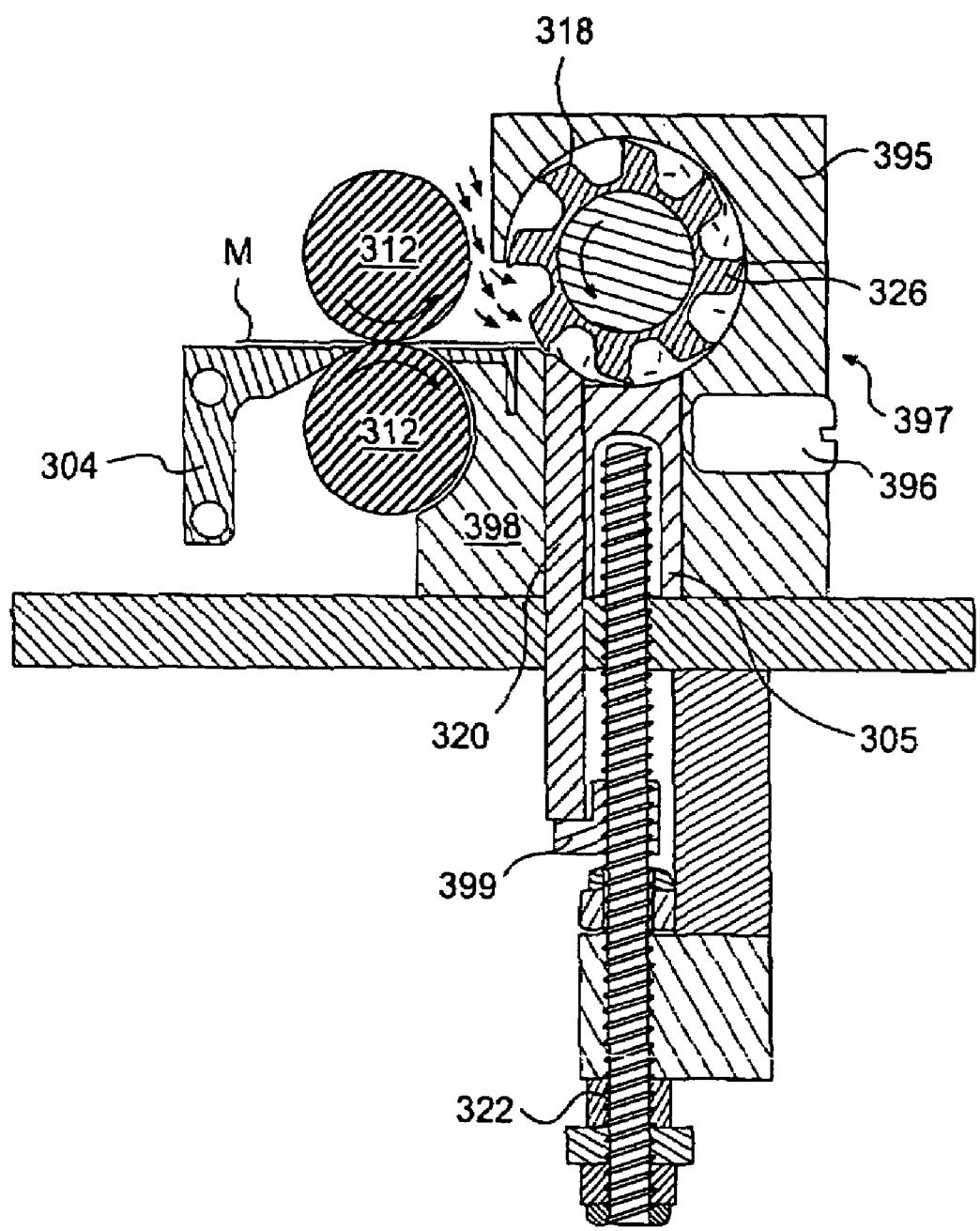
Figure 12B:
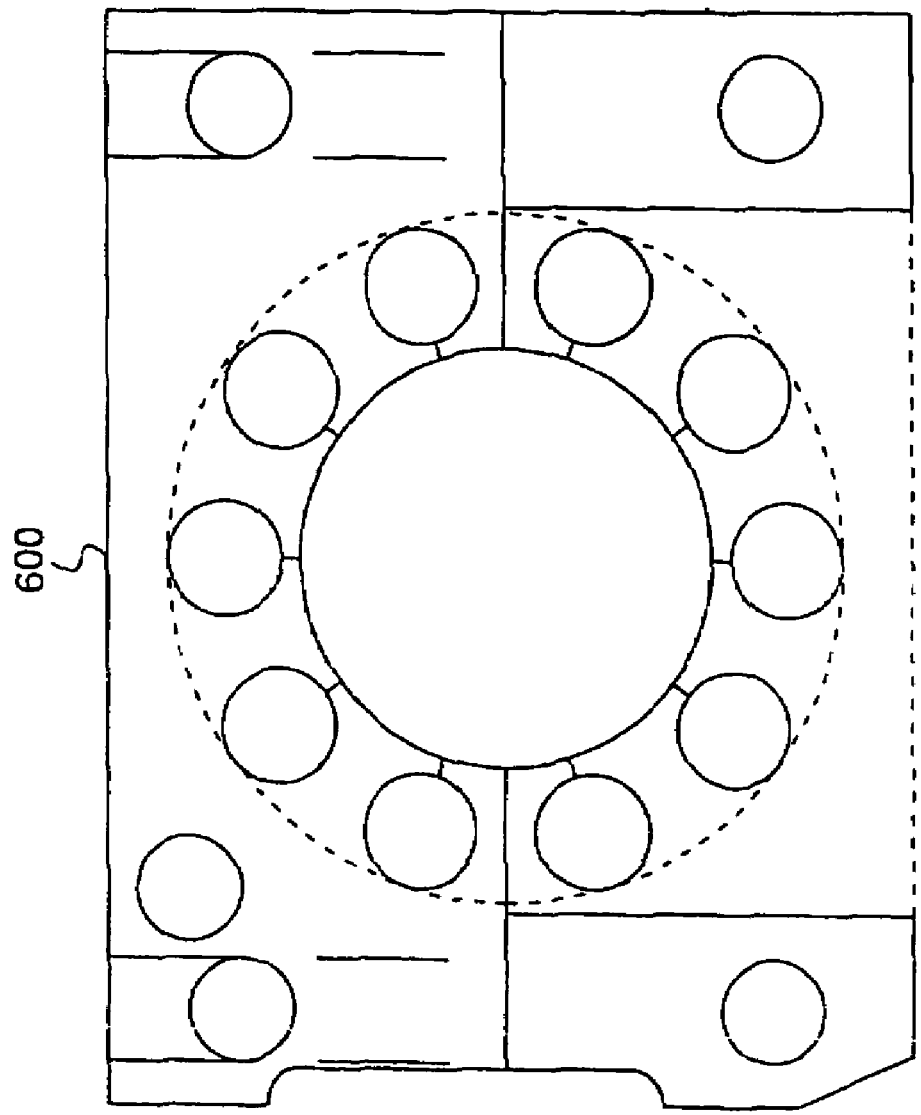
Figure 12D:
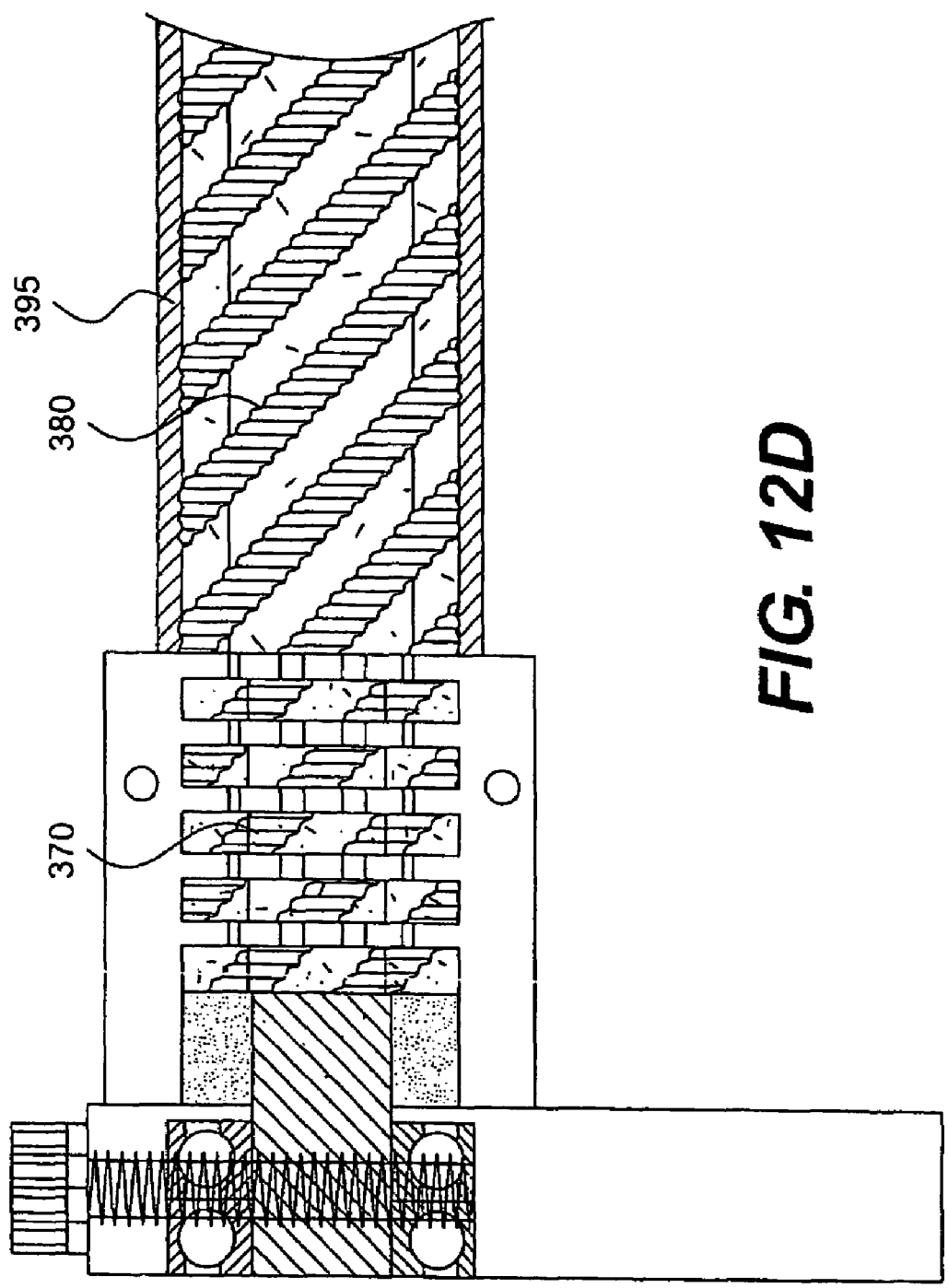

The cutter for use in destroying 8½ inch wide paper should be strategically patterned with raised cutting edges (with serrated cutting edges being preferred, and strategic patterning as in FIGS. 11, 12C and 12D being most preferred). A basic principle according to the invention, namely, the use of a plurality of small edges that take tiny nibbles of the to-be-destroyed material, is used. Preferably, a cutter with vertical serrations is used. Most preferably, a small lateral or axial offset distance (such as ⁷⁄₁₀₀₀ inch (0.007 inch)) is provided for the vertical serrations, as shown as offset 800 on FIG. 11. The preferred pattern resembles what in the machining trade is called "chip breakers." The preferred small-offset design is particularly helpful in cutting the last strip of paper or to-be-destroyed material, which, when the length-wise material reaches the end of its travel into the machine, has nothing controlling its travel path. Also, preferably the entire cutter assembly is cowled (enclosed in a close-fitting cylindrical construction).

Referring to FIG. 11, a close-up view of a rotary cutter 318 with cutting edges 318a suitable for use in destroying 8½ inch wide paper, the strategic patterning of a rotary cutter may be further appreciated. A tiny horizontal offset 800 between leading edges of serration teeth, the offset occurring between successive flutes, is shown. The tiny serration teeth successively bite off minute chunks widthwise due to the offset 800, as the cutter 318 rotates. The serration teeth and flutes successively bite off minute chunks length-wise due to the relationship between the rate of material feed and cutter 318 (FIG. 12A) rotation speed (number of flutes passing per unit length of fed material).

The sacrifice plate for use in destroying 8½ inch wide paper is wider than 8½ inches, preferably 9 inches or more wide to facilitate document loading. More generally, referring to all embodiments of the invention, it will be appreciated that the width of the sacrifice plate is adjusted to the width of the to-be-destroyed item. In the case of the 8½ inch wide paper, requiring a sacrifice plate at least slightly wider than 8½ inches, and that width being relatively wide for engineering considerations, the sacrifice plate preferably is supported at more than one point, such as at two points for the device of FIG. 12A. By synchronously driving the jackscrews 322 in FIG. 12A, the jacknuts 399 can advantageously advance the sacrifice plate 320 upwards in an even and level fashion, thus promoting uniform contact between the upward edge of the sacrifice plate 320 and the cutting edges.

With reference to FIGS. 11 and 12A, cutting of the to-be-destroyed paper occurs between the cutter edges 318a and the sacrifice plate 320. Preferably, augering (screw conveyer) techniques are used and applied (and preferably used and applied repeatedly) to particles of cut to-be-destroyed material (such as cut paper). Augering is a well-known material conveying technique and is particularly useful in this high-security destruction application. For example, most preferably, a 45 degree helical design is considered optimal for moving the cut particles laterally. Referring to the cutter of FIG. 11 and the destruction machine of FIGS. 12A-12D, a cut particle is urged in a lateral direction by the helical design. Lateral movement of the particles and the promotion of re-cutting and multiple re-cutting are applied to accomplish ultimate cutting into fine, powdery particles.

Thus, destruction of the end strip of paper fed into the destruction machine is addressed by the cowling feature and by a secondary shredder 370 (see FIGS. 12C-12D). By action of the rotating cutter, all of the cut particles get flung outward at the same rate. A relatively big particle flung outwards will get re-chopped at the sacrifice plate 320 (which presents a sharp edge). All particles are captured by the cowling, and no particle can exit radially. The only way for a particle of to-be-destroyed material to leave is axially, by way of a plurality of holes in the stator walls of the secondary shredder (also called a comminuter) 370.

The secondary shredder's rotating cutter segment 370 uses the same general fluted and serrated design as in the primary cutter 380, with grooves (preferably such as ²⁄₁₀ inch (0.2 inch) grooves). The groove size is selected for proper clearance between the drilled stator walls and the sides of the cutting flutes. Upon entering a side hole, an entering particle is sheared between the stator wall and the side of a cutter flute as it tries to go through the side hole. Multiple chopping of a particles that enter the side hole is provided, with 10 being a suitable number of chopping times, but the number of chopping times not being required to be 10. Each hole in the stator wall provides two shearing edges, one on each side of the wall. Since the cutter has multiple flutes, each hole, in combination with the multiplicity of flutes, can do a great deal of rapid shearing. Further, since each stator wall has a multiplicity of holes, and is engaged successively by a multiplicity of rotating flute side-edges, the Secondary Shredder assembly has a large capacity to do the shearing job in a very small physical space.

Clearances preferably are not greater than 0.002 inch between the rotor (blade) and the stator walls, due to practical machining tolerances. The secondary shredder 370 shown in FIGS. 12C-12D has no sacrifice plate, therefore it does not provide the zero-clearance feature. Rather, clearances as close to zero as practicable are utilized, and both stator and cutter are of similar hardness.

For designing the holes and the cutting edges that will be applied to a particle that travels through the holes, a preferred arrangement is as follows. The holes go straight through. The strategic pattern of the cutting edges and flutes on the secondary shredder 370 is such that, from the perspective of a particle, one cannot see straight through, without seeing one or more blades blocking the path through.

Preferably, vacuum technology is applied so that a particle that has traveled through the secondary shredder 370 is sucked out by vacuum suction. Centrifugal force drives particles outward, and augering (screw conveyer action) drives particles sideways; vacuum application furthers those objectives. Because dust is being made, a vacuum should be used anyway to collect and dispose of the dust. By the configuration according to FIGS. 12C-12D, positive air pressure is generated by the cutter geometry and rotation because, as with a screw compressor, the particles and air are accelerated sideways as well as radially. It will be appreciated that, although FIG. 12A implies a standard desktop device with paper fed parallel to a desk surface, a destruction device also may be configured so that paper is fed vertically (i.e., perpendicular to a desk surface), or in some other feed configuration. Vertical feeding may be preferable because any particles that bounce out as a result of the violence of the shredding action will fall and be sucked back in.

Thus, a rotary cutter with cutting edges in a strategic pattern, a relatively-softer sacrifice material in zero-clearance disposition to the cutting edges, cowling technology and augering technology may be combined to achieve destruction of information-bearing paper (such as standard 8½ inch wide paper) and paper-like materials into fine, powdery particles of high-security size (i.e., smaller than U.S. National Security Agency (NSA)'s newly promulgated in 2002 smaller-size destruction requirements). It is believed that, before the present invention, a commercially practical technique was not known for reliably converting paper and paper-like materials into such fine, powdery particles, and only into such fine particles, leaving no undestroyed material. The nearest approximation would have been a "disintegrator", which operates very differently, is much, much larger, and can only guarantee fine-particle output if fitted with a very fine screen. Such a fine screen greatly reduce the rate of material processing, so much as to make the machine impractical.

The cutter and relatively-softer sacrifice material, and strategic augering and cowling and Secondary Shredder having been thus mentioned above, the following further engineering details are mentioned for advantageously achieving high security destruction of 8½ inch wide paper, but are not necessarily required exactly as shown in the accompanying figures in a destruction machine.

Referring to FIG. 12A, material guide 304 guides the to-be-destroyed material M (such as paper). Pressure rollers 312 are disposed below and above the to-be-destroyed material M, applying spring pressure to squeeze the to-be-destroyed material M to provide exact metering (exact metering being important). The 9-inch wide sacrifice plate 320 (made of a material relatively softer than the cutter) is supported by a bolster block 305. The sacrifice plate 320 can be incrementally moved into contact with the cutter (i.e., with the cutting edges of the cutter) by a jacknut 399, which moves the sacrifice plate at a slow rate, for gradually using up the sacrifice plate. The jacknut 399 pushes the sacrifice plate 320 upwards. A fixed clamp bar 397 pushes against the bolster block 305, with the pushing being accomplished by spring plungers 396 mounted within clamp bar 397. The sacrifice plate 320 is eventually resisted by the static block 398. The static block 398 provides the location and support for the sacrifice bar 320. The static block 398, bolster block 305, springs, spring plunger, and the fixed clamp bar 397 operate together to constrain the sacrifice bar to only move vertically. A tight sliding fit is provided for the sacrifice bar. The sacrifice bar 320 is slidably supported by the static block 398.

As seen on FIG. 12A, starting with the cutting zone on the rotary cutter 318 and proceeding 360 degrees counterclockwise, the cowling around the cutter may be appreciated as follows. For about the region from 0 to 45 degrees, the cowling is provided by the sacrifice bar 320 and the first half of the bolster block 305. For about the next 90 degrees, still moving counterclockwise, the cowling is provided by the second half of the clamp bar 397, together with all of the fixed clamp bar 397. The final 180 degrees, moving counterclockwise along the rotary cutter 318, is provided by the cowling 395. The amount left on the cutter 318, namely, about 45 degrees, is the opening, where to-be-destroyed material M enters. This zone is largely blocked by the feed rollers 312, so that any particles flung out by the cutter 318 will tend to rebound back in to the cutter and cowled space. Note also that there must be an opening for air to enter, in order for the vacuum to entrain cut particles and carry then through the cutter system for collection. The air-space gap between the interior surface of the cowling and the exterior surface of the cutter 318 is relatively small, with the cowling being quite tightly fitting around the cutter 318, while of course not touching the cutter 318 in operation. The tight cowling fit is desired to keep to-be-destroyed material in the cutting system and to keep the to-be-destroyed material and pieces thereof moving.

Referring to FIG. 12A, the static block 398 supports the sacrifice plate 320. The cowl reaches all the way across axially and covers 180 degrees. The cowl is a half-moon shape, for the full 9 inch length. Attachment is by bolting to a plate (not seen in the figure), with bolting only on the top of one side. This allows for rapid and easy removal of the cowling for inspection, cleaning, and maintenance.

An approximately 45 degree open gap is provided, from about the 90 degree point, down to the paper, so that the paper can enter. An almost complete enclosure "tube" is thus provided as considerable blocking is provided by the rollers immediately adjacent.

Importantly, a significant advantage of the inventive system is mechanical simplicity. The Secondary Shredder cutter array is merely an additional section grooved into one end of the cutter 380. A suitable stator assembly 600 (made in two halves) is simply bolted around one end of the rotating cutter, with apertures suitable for exhaust of the particles by a simple vacuum. This is very different from conventional shredders using multiple heads.

Referring to FIG. 12A, vacuum air entry is shown by small arrows between the pressure roller 312 and rotary cutter 318. The vacuum aspects, and other aspects, of an exemplary system according to the invention may be further appreciated with respect to the paper-feed view of FIG. 12C, from which we can see particle motion from combined action of: augering by cutter flutes, centrifugal force, and vacuum air flow. Rotation is depicted on the figure, with the top of the cutter rotating towards the viewer. A vacuum plenum 390 is shown, and a vacuum residue collection system 389. The part of the rotary cutter 318 that is the primary rotary cutter is shown as primary cutter 380 on FIGS. 12C-12D; the part of the rotary cutter 318 that is the Secondary Shredder is shown as secondary shredder 370 on FIGS. 12C-12D.

Referring FIG. 12A, and an example in which the to-be-destroyed material is paper, the destruction operation will be further appreciated as follows. As the paper advances into the device, the paper undergoes a cut and drag process. If the rotary cutter 318 is fast enough, the motion of the paper is trivial. Depending on the cutter motion and speed, and on the paper feed, a certain bite pattern on the paper results. A non-serrated cutter would give a slice. A serrated cutter is needed to get the tiny nibbles rather than the less-desirable larger slice. (A serrated cutter also is called a "chip-breaker" cutter, also called a "roughing end mill", generally use for initial, rough-cutting work on metals.)

Destruction devices according to FIGS. 12A-12D advantageously take into account possible clogging, by providing for unclogging by simple cowling removal, whereupon blowing and vacuuming can be performed.

A wire keeper (not shown on FIG. 12A) optionally may be disposed to prevent to-be-destroyed paper (such as flimsy older facsimile paper or very thin film) from undesirable curling down and around roller 312, between the top of guide 304 and the top of the static block 398 across the rollers. A deliberate gap is shown on FIG. 12A (between the bottom of guide 304 and the machine base), so that if paper does curl, it has a way out. The wire keeper also can be used on a machine according to FIG. 1, and provides especial advantages there because there is no exit gap on the design of FIG. 1 for curling paper.

It will be appreciated that advantageous features mentioned above with regard to FIGS. 12A-12D, while particularly favorable for use in destroying paper (especially letter-width paper) also may be applied to destruction of other to-be-destroyed materials.

Thus, the present invention provides for high-security destruction of various to-be-destroyed materials that are planar and relatively thin, with preferred examples being ordinary paper; key tape (e.g., paper alone; mylar alone; paper/mylar bonded together; paper/mylar/paper bonded together); photographs; film; transparencies; compact disks; credit cards, Smart Cards, cardboard; magnetic tape; diskettes, thin plywood; a whole cassette (preferably with the screws removed); etc.

While particular mention has been made of destruction of thin materials, and objects contacting thin materials, the invention also may be applied to destroy thicker materials. When feeding a thicker material, the horsepower of the cutter, the speed of the cutter, and/or the feeder speed is adjusted compared to a thin material. A single machine may be provided that is adjustable for a range of various thicknesses and compositions of materials to be destroyed.

Further favorable details for devices according to the invention are as follows, understanding that the invention is not limited thereto. The following perfecting details may be appreciated with reference to an inventive embodiment such as the example shown in FIG. 1. Namely, there may be included side plates on opposing sides of the pressure roller and the friction feed capstan, the side plates retaining the pressure roller and the friction feed capstan in a predetermined position. When such an arrangement is used, optionally each of the side plates may comprise a slot and opening; and the pressure roller may further include a roller shaft with the roller freely rotating thereabout, the roller shaft being captured by the each slot of the side plates. There may further be included pressure screws insertable within each slot for adjusting a downward pressure on the pressure roller against the friction feed capstan. There may further be included spacers which, in combination with the pressure screws, provide an adjustable deflection of rubber-like material of the pressure roller against the friction feed capstan. The deflection determination is fixed by design (thickness of the spacers), but relieves the operator from making any routine pressure adjustment. This provides a significant operational advantage of simplicity.

When side plates are used, the opening of each of the side plates may allow the roller shaft to be removed from between the side plates in order to quickly and easily remove the pressure roller. Also, when side plates are used, there may be included a first screw positionable within the vertical slot of the first side plate and contacting a first end of the roller shaft in a first position; and a second screw positionable within the vertical slot of the second side plate and being able to contact a second end of the roller shaft in the first position. There may be included first and second spacers positionable with respect to the first and second opposing side plates, respectively. It may be configured wherein the first and second spacers in combination with the first and second screws provide an adjustment deflection of rubber-like material of the roller mechanism against the driven capstan. The deflection determination is fixed by design (thickness of the spacers), but relieves the operator from making any routine pressure adjustment. This provides a significant operational advantage of simplicity.

The metering mechanism may provide positive control of feed of the to-be-destroyed material as established by the capstan rotation. In additional embodiments, a positively controlled feeding mechanism may be provided, such as one in which the feeding mechanism includes a first and a second side plate, both having a vertical slot and an opening. Additionally, a driven capstan mechanism may be positioned between the first side plate and the second side plate. A roller mechanism having a roller shaft also may be provided. The roller shaft may be captured within the vertical slot of the first side plate and the vertical slot of the second opposing side plate. The roller shaft further may be positionable relative to the opening of the first side plate and the opening of the second side plate for removal therefrom. In embodiments, a first and a second screw are positionable within the respective vertical slots of the first and second side plates. Spacers may also be provided. The spacers, in combination with the screws, provide an adjustable deflection of rubber-like material of the roller mechanism against the driven capstan. The deflection determination is fixed by design (thickness of the spacers), but relieves the operator from making any routine pressure adjustment. This provides a significant operational advantage of simplicity.

There may be included a pressure plate in contact with the sacrificial blade or round bar, the pressure plate substantially preventing vibrations caused by interactions of the rotary cutter and the sacrificial blade or round bar. There may be included a spring plunger contacting the pressure plate, the spring plunger forcing the pressure plate against the sacrificial plate or round bar.

There may be included a guide mechanism upstream from the metering mechanism, the guide mechanism being in line with the metering mechanism and providing a guide for the to-be-destroyed material to be fed into the metering mechanism.

Figure 9:
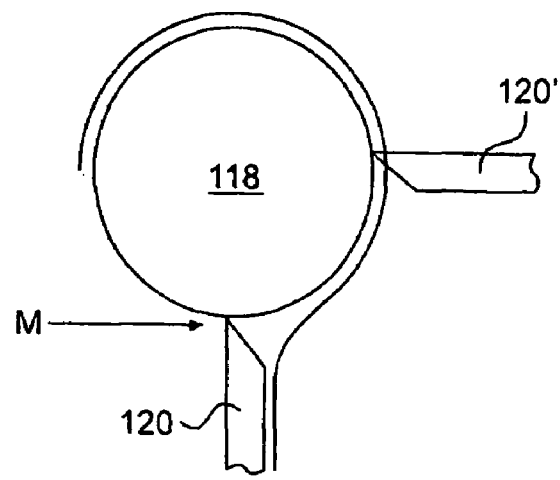
FIG. 9 shows an exemplary inventive embodiment in which more than one sacrifice material is used.

While FIGS. 1 and 3 for simplicity and as a preferred embodiment show destruction devices each using a single sacrificial material, it will be appreciated that the invention also includes using sacrificial material in two or more locations. FIG. 9 is only one example of using sacrifice material at more than one location. In FIG. 9, a to-be-destroyed material M is being fed towards a rotating cutter 118 provided within a relatively-tightly cowled housing. As in FIG. 1, a sacrifice blade 120 is disposed for contact with the rotating cutter. Additionally, a second sacrifice blade 120' is disposed at another location for similar contact with the rotating cutter, for providing a second zero-clearance cutting zone. Each of sacrifice blades 120 and 120' could be replaced by a round bar material appropriately arranged.

In the invention, the shape of a to-be-destroyed material may be generally regular (such as generally planar (such as a sheet of paper, photograph, etc.), etc.), or may be irregular (such as cut, torn, wrinkled, bunched, etc.), so long as the to-be-destroyed material is suitably disposed in a cutting system including at least one sacrificial material.

The invention not only provides zero-clearance cutting systems and methods, but, such zero-clearance cutting systems and methods are maintainable. For example, maintainable zero-clearance cutting of the present invention provides on the order of millions of cuts with the same configuration of sacrifice blade and cutting edge without changing the sacrifice blade or cutter.

Above, a secondary shredder has been mentioned. Further perfecting details regarding a secondary shredder are as follows. The secondary shredder may include a single shaft common to the rotating secondary shredder and the rotating primary cutter. Such a use of a common shaft provides advantages of simplicity, low cost, ease of manufacturing, and reduced number of parts. The secondary shredder may be an extension of the primary cutter, with no change in basic cutter geometry from the primary cutter. The cutter may be grooved to accommodate a stator. On the secondary shredder may be created a very large number of individual cutting stations (such as 600 to 800 cutting stations in a cylindrical envelope of 1.3" diameter×1.3" long). Converting a radial cutting action into an axial cutting action may be provided. The helix of the basic cutter may be exploited to block straight-through passage of a particle through the secondary shredder, thus guaranteeing multiple cuts. A very large number of cutters may be provided in a very small space. The geometry of the stator walls may be kept extremely simple (such as straight-through common-axis holes through all of the stator walls). The stator may itself be simple and easy to attach (such as a split housing which simply clamps over the cutter). There may be provided a very simple means to clean, inspect, and maintain the secondary shredder, by removing a few screws. There may be exploited the helical geometry (such as the helical flutes) of the cutter and the secondary shredder section (or other suitable geometry) to "pump" air laterally towards the secondary shredder and the residue vacuum port and/or to "pump" already-cut particles laterally towards the secondary shredder and the residue vacuum port. A vacuum may be used to enhance transport of already-cut particles laterally towards the secondary shredder section. A vacuum may be used to enhance transport of the particles out of the machine for collection.

Without the invention being in any way limited thereto, some examples of using the invention, in various embodiments, are mentioned as follows.

EXAMPLE 1

A prototype machine was built, Model KD-100 (Key Tape Disintegrator), one instance of the more general class of machines which the present inventor calls "Micro-Disintegrators". This class of machines is so named for two principle reasons: 1) Because the machines are physically small, considering their function, 2) The output (or "residue", as it is designated in the art) produced by such machines is composed of extremely small dust-like particles, similar to those from a disintegrator, but finer. The actual KD-100 resembles that depicted in FIG. 1.

It utilizes only a single motor which performs all four of these functions: a) drives the cutter; b) drives the vacuum dust collection system; c) drives the positively-controlled material capstan feed (through gear trains); d), drives the extremely slow and gradual upwards motion of the sacrifice plate (through an additional gear train). The actual machine is in full compliance with Department of Defense (DOD) requirements lists, meeting or exceeding all "must-have" requirements and meeting or exceeding all "desirable" requirements, specifically for the destruction of Key Tape. In this (KD-100) machine, the cutter is made from high-speed steel, and (optionally) a solid-carbide cutter is available, with a life of 2-to-10 times that of high-speed steel.

The KD-100 uses ordinary 1/16" or 3/32" thick soft aluminum for its sacrifice blade. The model KD-100 machine destroys materials made of paper; made of a blend of plastics (such as polyester) and paper; and made from polyester (or other thin plastics) alone, more completely than by shredding alone, leaving no useable or recoverable information, reducing such materials to dust-like particles. The model KD-100 machine provides extremely high security, because it reduces the information to an absolutely information-unrecoverable form, i.e., dust. The model KD-100 machine is fast—it declassifies a 10" strip of Key Tape to dust in about 4 seconds (very desirable in the event that an emergency requires rapid data destruction). The model KD-100 machine is easy and safe to use, requiring no special operator skill, even under conditions of high operator stress. There are no doors or drawers to open; no buttons to push; no latches, catches, levers or hasps to operate. There are no exposed moving parts. The model KD-100 machine is simply switched on, and the Key Tape is inserted. The feed system automatically captures the Tape, and feeds it to the cutting system. Switch off when done. The model KD-100 machine is low in cost, because it is physically small, light in weight, mechanically simple, and uses a minimum of moving parts to perform its function. The model KD-100 machine consumes very little energy to perform its function (typically under 300 watts) and is thus practical to use with a small and low-cost back-up battery system. The model KD-100 machine is rugged due to its simplicity of design and the robust character of its components and attachments. For example, it uses a heavy-duty NEMA 4X fiberglass sculpted, gasketed enclosure. The model KD-100 machine is relatively quiet (75 dBA, measured at the operator's ear), for an unobtrusive operation in an office environment. The model KD-100 machine is friendly to the environment, because it merely cuts material, producing no high temperatures, airborne dust, smoke, toxic fumes, or residue. It simply makes a cool, harmless powder. The model KD-100 machine is easy to maintain because of its basic simplicity, small number of moving parts, and quick-release mechanisms. Examples: Cutter replacement, along with cutter bearings (done in one operation) takes under 10 minutes. In an additional 2 minutes, the sacrifice blade can be replaced. Motor replacement can be performed in about 5 minutes. Rubber roller replacement can be performed in under 1 minute. These are the only parts that one might normally need to replace to due normal wear and tear. No lubrication required. Requires no special tools to fix or adjust it. The model KD-100 machine provides the possibility of almost-silent covert operation (by reducing speed). The model KD-100 machine allows for emergency high-volume operation as follows: a) snap open the lid; b) remove the bag; c) insert an exhaust tube; d) operate. The model KD-100 machine contemplates and allows for the possibility of power loss: the tape can just be pulled out. The model KD-100 machine is compact, having a size of 8×10×6-½" (h) (i.e., 205×255×65 mm). The model KD-100 machine is light, weighing 9.1 lbs. (4.1 kg). The model KD-100 machine is a desk-top design, by virtue of this small, light-weight size. The model KD-100 suits a right-handed or left-handed operator simply by rotating the entire machine 90 degrees to suit. The model KD-100 machine provides superior residue processing and disposal using a low-cost disposable filter bag, which is quickly and easily changed. The KD-100 machine destroys materials made of paper; made of a blend of plastics (such as polyester) and paper; and made from polyester (or other thin plastics) alone, more completely than by shredding alone, leaving no useable or recoverable information, reducing such materials to dust-like particles.

EXAMPLE 2

Round-bar Sacrifice Material

In this example there is assumed a round sacrifice bar ⅜" diameter, or 1.17" circumference. A full revolution of the bar would present 1.178 million micro-inches to the cutter. At about 13 ft/minute, the sacrifice feed would be 30×13 (or 390) micro-inches circumferentially per minute, which works out to $390/_{1,178,000}$ (or 0.000331) sacrifice bar revolutions per minute, or 0.0198 (or $1/_{50.34}$) sacrifice bar revolutions per hour. The bar will last about 50 hours, or 46,800 feet. In this case, a feed rate of approximately 30 micro-inches of sacrifice material per foot length of destroyed material, or about 400,000 inches of destroyed material per inch of sacrifice material is provided, for this round-bar sacrifice material example.

This may be compared to about 0.500 sacrifice JACK-SCREW revolutions per HOUR in a sacrifice PLATE embodiment. Correspondingly, more worm-gear drive ratio reductions are needed to operate with the round bar.

EXAMPLE 3

DocuStroyer Paper-destruction Machine

A destruction machine for to-be-destroyed 8½ inch-wide paper was constructed according to FIGS. 12A-12D. A cutter was made from cobalt steel, coated with titanium nitrate (to enhance its hardness). A cutter as in FIG. 11 was used. The cutter had raised cutting edges with vertical serrations, with a 0.007 inch offset pattern to the serrations. A 9-inch wide sacrifice material of ³⁄₁₆ inch thick soft aluminum was used. A destruction machine for 8½ inch wide paper was constructed as described above with regard to FIGS. 11-12D.

The inventive DocuStroyer machine was tested on 10 paper pages in rapid sequence, fed one at a time (generating 10 end-strips). The end-of-page strip processed through the secondary shredder. All that remained of the 10 paper pages was powdery dust.

In addition to the excellent destruction capability provided by the DocuStroyer device of this example, the inventive machine has mechanical advantages over conventional paper-destruction machines.

|  | Number of rotating cutter parts |
|---|---|
| Inventive Example 3 | 1 |
| Conventional commercial 3-head paper destruction machines | 6 |

Examples 1-3 reflect cutting systems have been accomplished which are capable of cutting a material such as, for example, tape or paper, into a fiber or powder. In these examples using a rotary cutter and a relatively-softer sacrifice material, the contacting portion was observed to have zero clearance during the cutting operation. Zero clearance during the cutting operation enhanced the ability to destroy the material. Also, destruction of material was further enhanced by advantageous strategic patterning of cutting edges on a rotary cutter (such as applying an offset to the cutting edge pattern), and further by secondary shredding features (such as the secondary shredder of Example 3 and FIGS. 12C-12D). The invention was observed in the testing of Examples 1-3 above to provide systems for reducing to-be-destroyed paper and other relatively-thin planar materials to a dust or powder-size.

EXAMPLE 4

Maintainability of Zero-clearance Cutting

For a paper destruction machine according to Example 3, in which a sacrifice blade is used with the cutter of Example 3, maintainability is calculated as follows, where operation of the cutter is at 15,000 rpm, with 24 cuts per cutter revolution. 2500 feet of paper are processed at 4 seconds/foot, which is 10,000 seconds which is 166 minutes of operation. 166 minutes of operation multiplied by 15,000 rpm is 2.49 million revolutions. 2.49 million cutter revolutions multiplied by 24 zero-clearance cuts per revolution is 59.76 million zero-clearance cuts.

After 59.76 million zero-clearance cuts of paper (which is very abrasive), the cutting blade is expected to then be dulled by the paper (rather than dulled by interaction with an object other than that being cut). The sacrifice material is relatively unspent, and may still have miles to go (enough material remaining for another 30,000 feet of key tape). From these calculations, the advantage is seen of how very many precision zero-clearance cuts may be provided without the cutter being dulled. For conventional zero-clearance cutting, it would not be possible to provide millions or tens of millions of cuts without blade dulling.

EXAMPLE 5

Reciprocal Cutter Systems

Figure 7:
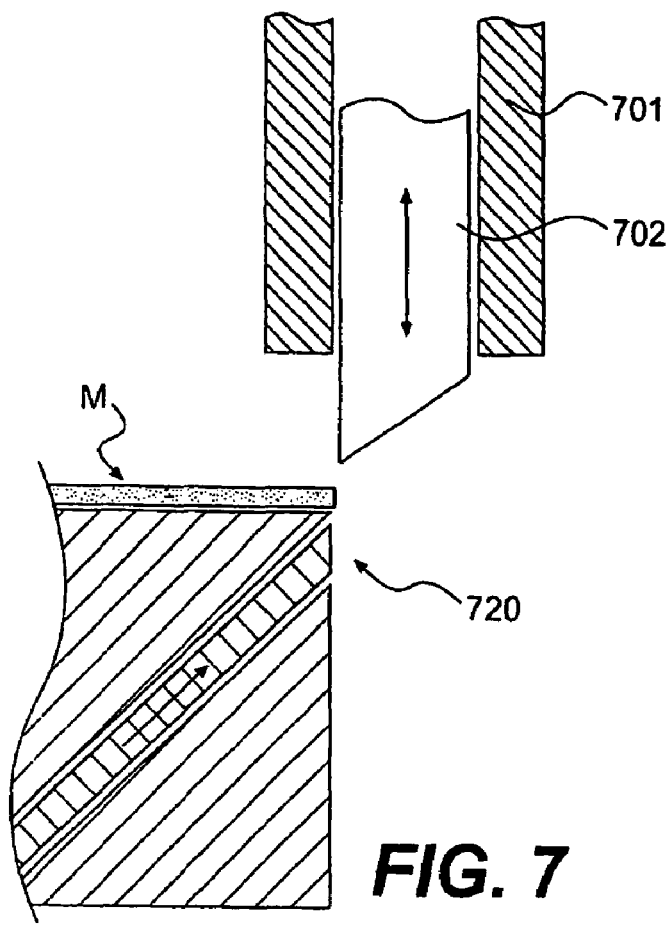
FIGS. 7-8 show exemplary reciprocal cutter systems according to the invention, with FIG. 7 showing an exemplary inventive embodiment in which a sacrificial blade is diagonally-fed towards a shearing blade and FIG. 8 showing an exemplary inventive embodiment in which a to-be-cut material is diagonally-fed and a round sacrifice material is used with a shearing blade.
Figure 8:
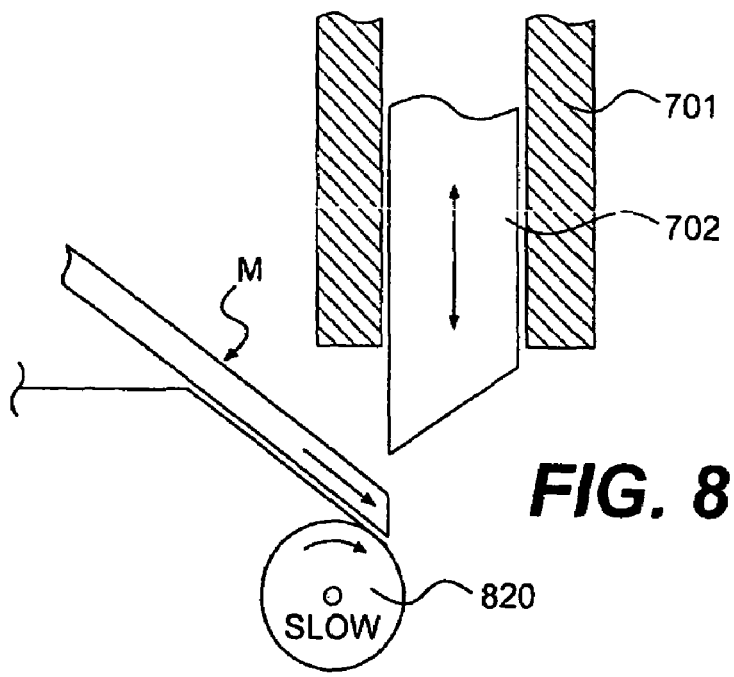

Another example of usage of a sacrifice material is with a reciprocal cutter system, such as a reciprocal cutter system in which a sacrificial blade is used with a shearing blade (such as, for example, in FIG. 7) or a round sacrifice material is used with a shearing blade (such as, for example, in FIG. 8). In the reciprocal cutter system of FIGS. 7 and 8, a tight fitting guide 701 is shown. A blade (such as a steel blade) goes up and down.

In FIG. 7, a sacrificial blade or bar or plate 720 (constrained by its own tight-fitting guide) is very slowly advanced towards a shearing blade 702 (such as a steel reciprocating shearing blade). The sacrifice material slowly advances to the point of cutting. The arrangement of FIG. 7 is particularly suited for thin materials.

In FIG. 8, a round sacrifice material 820 is used with a shearing blade 702. To-be-cut material M is fed on a tangent to the rotating sacrifice material 820. The rotation of the sacrifice material 820 is extremely slow. (The diagonal feeding of to-be-cut material M shown in FIGS. 7 and 8 also may be used in other embodiments of the invention and is not restricted to embodiments in which a reciprocal cutter is used.)

EXAMPLE 6

Referring to the inventive example depicted in FIGS. 11-12, if there are 10 holes in each wall, and 6 cutter flutes, and 10 wall edges, then a single revolution of the cutter results in 600 shearing operations. If an 8-flute cutter is used, then a single revolution of the cutter results in 800 shearing operations. The inventive example depicted (FIGS. 11-12) is so configured, and has been built and tested successfully with both 6-flute and 8-flute cutters. Even at a relatively slow cutter speed of 1,500 RPM, there would be 0.9 to 1.2 million shearing operations/minute (Or 15,000 to 20,000 shearing operations/PER SECOND). The inventive example depicted (FIGS. 11-12) has been successfully tested at 4 times this speed. Those conversant in the art can easily see that no particle could pass through the Secondary Shredder's blizzard of cuts without being reduced almost to dust. In fact, a large percentage of this machine's output actually is dust.

While the invention has been described in terms of preferred embodiments, those skilled in the art will recognize that the invention can be practiced with modification within the spirit and scope of the appended claims.

The invention claimed is:

1. A helical cutting system without a fine screen, comprising:
   a helical cutter, and
   a plurality of holes in a stator wall;
   wherein a paper or a paper-like material is destroyed into particles of size smaller than U.S. National Security Agency's 2002 high-security destruction requirements.

2. The helical cutting system of claim 1, wherein the cutter and the stator wall are of similar hardness.

3. The helical cutting system of claim 1, comprising 600 to 800 cutting stations in a cylindrical envelope of 1.3 inch diameter by 1.3 inch length.

4. A helical cutting method, in which a helical cutter is operated, comprising: the helical cutter performing 15,000 to 20,000 shearing operations per second in a cylindrical envelope of 1.3 inch diameter by 1.3 inch length.

5. An apparatus comprising: a helical cutter in a cylindrical envelope of 1.3 inch diameter by 1.3 inch length, the helical cutter being configured that 15,000 to 20,000 shearing operations per second in the cylindrical envelope are performable by the helical cutter.

* * * * *